United States Patent Office 3,406,597
Patented Oct. 22, 1968

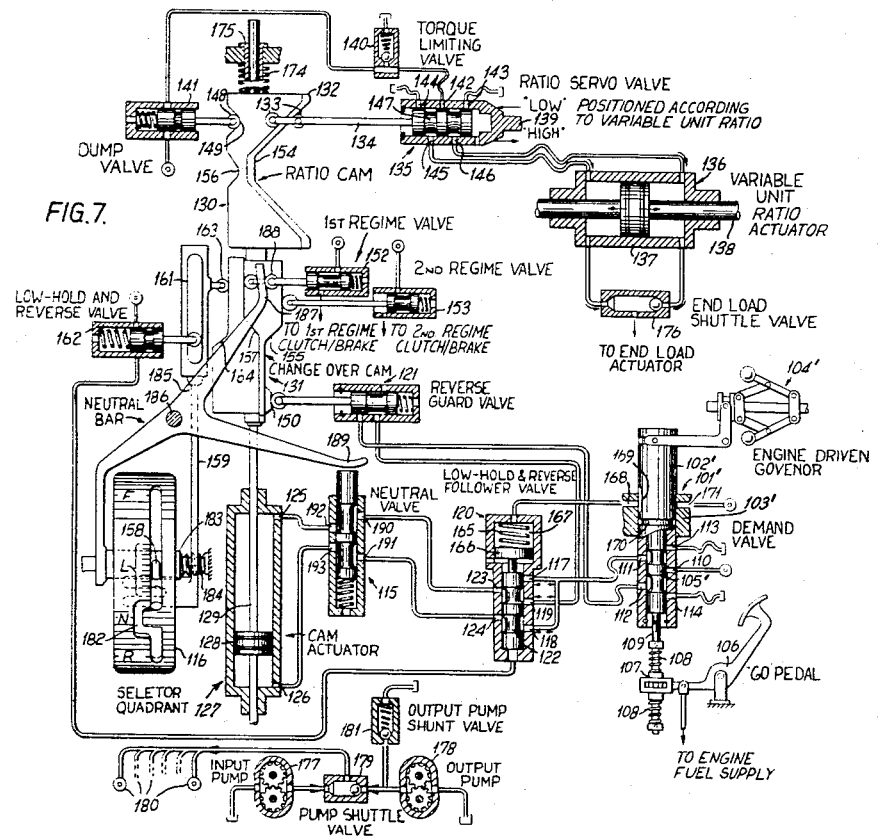

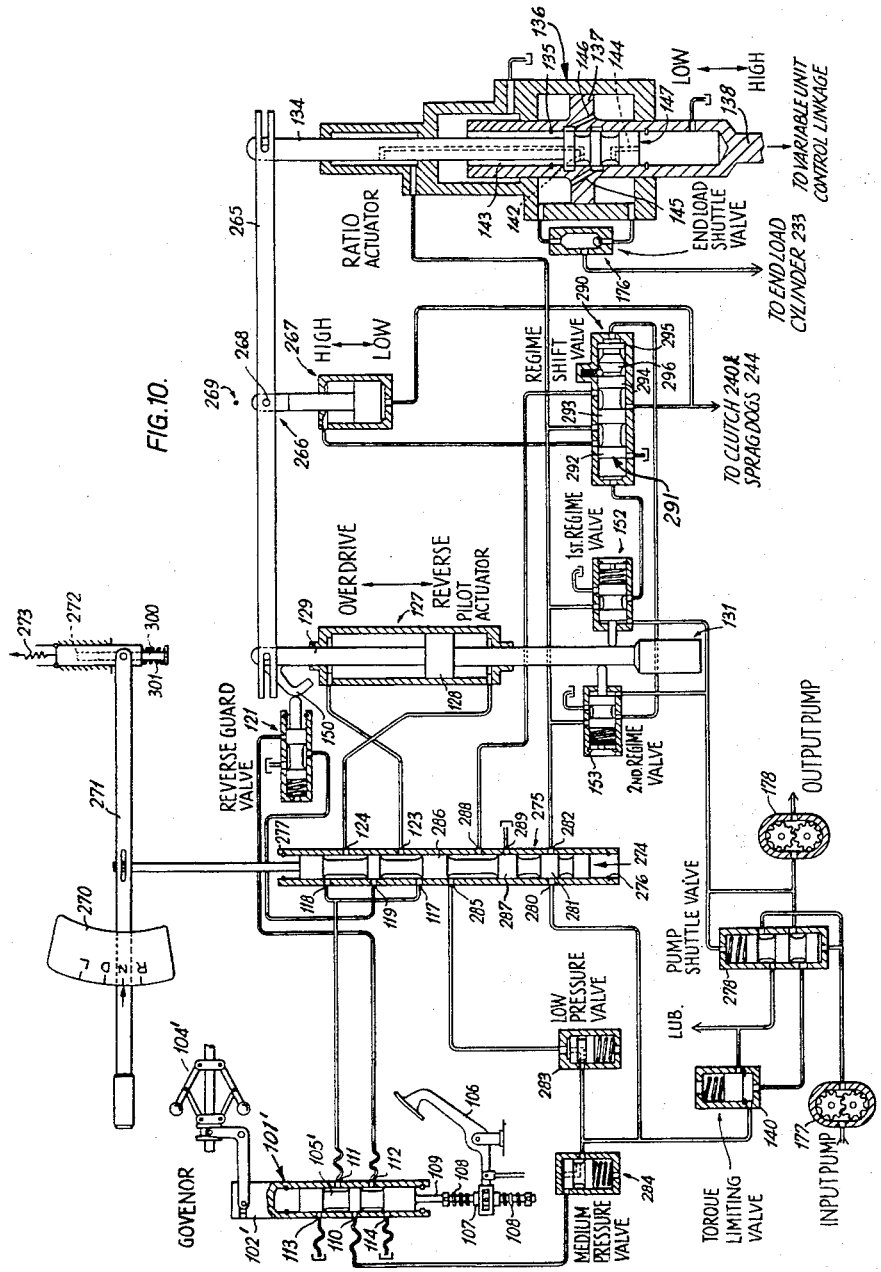

3,406,597
CONTINUOUSLY VARIABLE RATIO TRANS-
MISSION SYSTEM AND CONTROL SYSTEM
THEREFOR
Forbes George De Brie Perry, East Grinstead, Thomas
George Fellows, London, and John William Ledward
Petty, Haywards Heath, England, assignors to National
Research Development Corporation, London, England,
a corporation of Britain
Filed Nov. 26, 1965, Ser. No. 509,773
Claims priority, application Great Britain, Dec. 1, 1964,
48,737/64
26 Claims. (Cl. 74—865)

ABSTRACT OF THE DISCLOSURE

An infinitely variable transmission having two ranges of speed. The first range is effected through two power paths to a planetary gear set with an infinitely variable friction drive in one of the power paths. The second range, or regime, is provided solely by the friction drive, the low end of the second range overlapping the high end of the first range. A one way clutch may be utilized in one path of the first range and an automatic control is provided, responsive to engine speed and torque demand, to vary the transmission within each range and between ranges.

This invention relates to a transmission system for coupling a prime mover to a load and comprising a continuously variable ratio transmission unit which is, for brevity, hereinafter referred to as the "variable unit." The said variable unit may be of the so-called "rolling friction" type wherein rotatable elements engage one another in a rolling relationship capable of variation to vary the ratio between an input member and an output member of the transmission unit.

In particular the invention relates to a transmission system for coupling a prime mover to a load in which the said variable unit is capable of continuous and stepless variation of ratio between an input member and an output member of the variable unit over a range of ratios which does not include zero and in one sense only (i.e. for a given rotational direction at the input the output is capable of only one direction of rotation) and in which the system is capable of operating interchangeably in either of two regimes, a first regime in which the input member and the output member of the variable unit are coupled respectively to two elements of a three-element planetary gear train one of such two elements being also coupled to an input member of the transmission system as a whole, which member is adapted to be coupled to a prime mover, the third element of the train being coupled to an output member of the transmission system as a whole, which member is adapted to be coupled to the load, and a second regime in which the input member of the variable unit is coupled to the input member of the transmission system and the output member of the variable unit is coupled to the output member of the transmission system, the planetary gear train being such that, in the first regime, the overall transmission ratio of the system as a whole is zero at a first predetermined intermediate ratio of the variable unit, so that adjustment of the ratio of the variable unit in a first direction, from the first predetermined ratio towards an end of its ratio range produces a change in a first sense of the overall ratio of the transmission system as a whole, over a range which includes a second predetermined ratio which is within the range of the variable unit itself, the transmission system comprising means, operable on the attainment of the second predetermined ratio in the first regime, for changing the respective couplings of the transmission system input and output members, the variable unit and the planetary gear train from those according to the first regime to those according to the second regime, means for setting the variable unit ratio to the second predetermined ratio in the course of the change of regime, means for further adjusting the ratio of the variable unit whereby the overall ratio of the transmission system is further changed from the second predetermined in the said first sense, without change of direction of rotation of the output member of the transmission system, the transmission system further comprising means for reverting to the first regime in a course of a change of overall ratio of the transmission system in a second sense which is the opposite of the first sense.

According to one form of the invention the planetary gear train is so arranged that the second predetermined ratio is close to an extreme end of the ratio range of the variable unit and so that changes of overall ratio of the transmission system in the first sense, in the second regime are brought about by changing the ratio of the variable unit in the reverse direction, that is to say away from the said extreme end of its ratio range in the direction of the said first predetermined ratio. This form of the invention will be referred to as the "synchronous" form.

It is possible with such an arrangement to have the transmission system conditioned for operation in the first regime and the second regime simultaneously at one particular ratio of the transmission system as a whole which, as explained above, is obtainable in either regime and this facilitates a synchronous (and preferably automatic) change from the first regime to the second regime without disconnection of the drive from the prime mover to the load.

According to another form of the invention the planetary gear train is so arranged that, when the ratio of the transmission system as a whole attains the second predetermined ratio in the first regime, the variable unit itself is adjusted to a third predetermined ratio, near to that end of is ratio range remote from the second predetermined ratio, means being provided for changing the ratio of the variable unit to the second predetermined ratio in the course of the change from the first regime to the second regime.

This form of the invention will be referred to as the "asynchronous" form.

According to another of its features the invention consists of a control system for a transmission system comprising a transmissioin unit capable of continuously variable ratio change between certain limits for which the relation between the rotational direction of the input and that of the output does not vary, the system being capable of operation in either of two regimes in the first of which the transmission unit operates through gearing to provide a range of continuously variable ratios for the transmission system as a whole on the ratio of the transmission unit being changed towards one of the limits of its ratio range and in the second of which regimes the transmission unit operates to provide a further and extended range of ratios for the trasmission system as a whole, without a change in the direction of rotation of the output of the transmission system, on the ratio of the transmission unit being changed from the said one of the said limits towards the other of the said limits the said control system comprising a first servo system with two inputs, one representing the speed of the input to thte transmission system and the other representing the setting of a demand number the first servo system being adapted to give a signal when the two inputs depart from an equilbrium relationship the signal differing in character according to the sense of such departure, means responsive to such signals to move an output element in one diretcion or another according to the sense of the signals the said control system further comprising a second servo system adapted to apply a source of force to a ratio controlling member of the transmission unit to vary its ratio in sense and degree according to the position of an input member of the second servo system and a coupling between the output member of the first servo system and the input member of the second servo system such coupling being adapted to change the direction of coaction between the said two members as a predetermined overall ratio of the transmission system as a whole is reached the said output member also being coupled to means for changing from one to the other of the two regimes when the said predetermined overall ratio is reached.

According to yet another of its features the invention consists of a control system for a transmission system comprising a transmission unit capable of continuously variable ratio change between certain limits for which the relation between the rotational direction of the input and that of the output does not vary, the system being capable of operation in either of two regimes in the first of which the transmission unit operates through gearing to provide a range of continuously variable ratios for the transmission system as a whole on the ratio of the transmission unit being changed towards one of the limits of its ratio range and in the second of which regimes the transmission unit operates to provide a further and extended range of ratios for the transmission system as a whole, without a change in the direction of rotation of the output of the transmission system on the ratio of the transmission unit being changed from the region of one of the said limits towards the other of the said limits the said control system comprising a first servo system with two inputs, one representing the speed of the input to the transmission system and the other representing the setting of a demand member, the first servo system being adapted to give a signal when the two inputs depart from an equilibrium relationship, the signal differing in character according to the sense of such departure, means responsive to such signals to move an output element in one direction or another according to the source of the signals, the said control system further comprising a second servo system adapted to apply a source of force to a ratio controlling member to vary its ratio in sense and degree according to the position of an input member of the second servo system and a coupling between the output of the first servo system and the input member of the second servo system and with means operable when a predetermined overall ratio of the transmission system as a whole has been reached, to change the relative positions of said two members, and to change the said transmission system, from one to the other of the two said regimes when the said predetermined overall ratio is reached.

Certain embodiments of the invention are described below in relation to the accompanying drawings in which:

FIG. 7 is a schematic diagram of a control system for the said second embodiment of the invention.

FIG. 10 is a schematic diagram of a control system for the said third embodiment of the invention, and, FIG. 11 is a graph illustrating typical operating characteristics of the said third embodiment of the invention.

Figure 1:
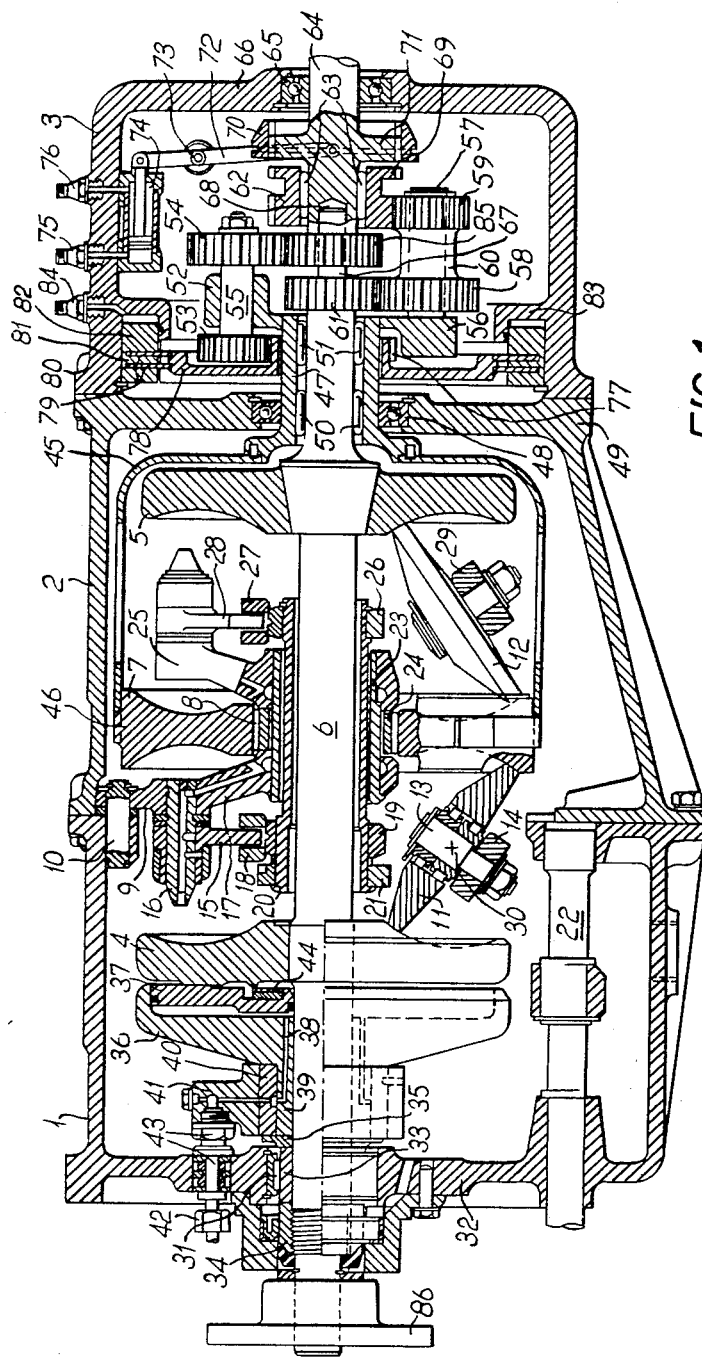
FIG. 1 is a section along the main axis of a first embodiment of the invention, in the synchronous form.

These embodiments of the invention were designed as road vehicle trasmission systems using, for the variable unit, a rolling friction device of the type in which rollers provide a driving connection between facing surfaces of an input disc and an output disc mounted for rotation about a common main axis, the said surfaces engaged by the rollers forming parts of a tourus generated by a circle rotating about the main axis. The locus of the centre of this circle is hereafter called the "torus centre circle." Such variable units cannot easily be designed so that they can be rotated in either direction at will, and also it is preferable that they should not be required to take up the drive when they are at rest. It has been proposed to avoid these limitations inter alia by locating the take-up clutch normally required in a vehicle transmission, between the variable unit and the load rather than the normal position between the prime mover and the variable unit which is usual with a conventional gear box installation. A clutch so located between the variable unit and the load must be capable of transmitting the maximum output torque, which in the lower ratios of the variabe unit, is several times the input torque; also if the clutch is to be operated automatically, it is difficult to avoid jerkiness as the drive is taken up. Whilst these problems are not insoluble there are strong arguments for attempting to eliminate the need to accelerate the vehicle from rest by means of a clutch and the embodiments of the invention illustrated in the accompanying drawings were designed with this objective.

With the variable unit adjusted to the said intermediate ratio which, in the first regime provides a ratio of zero for the transmission system as a whole, no torque is transmitted to the load from the prime mover whatever the speed of the latter. This is hereinafter referred to as the "geared idling" condition of the system and is comparable with the "neutral" or de-clutched condition of a conventional gear box installation.

If the ratio of the variable unit is now changed from the said intermediate ratio (hereinafter called the "geared idling ratio") torque will be transmitted to the load and a smooth take-up of the drive is readily obtainable. If the ratio of the variable unit is changed in one direction from the geared idling ratio the load is driven in one direction (the forward direction), and if it is changed in the other direction the load is driven in the other direction (the reverse direction); hence, in the specification and the claims, the overall ratio as between the main input means and the main output means of the transmission system as a whole is a quantity expressible as a fraction in which the speed of the latter is the numerator and the speed of the former is the denominator; likewise the ratio of the variable unit is a quantity expressible as a fraction of which the speed of the output disc is the numerator and the speed of the input disc is the denominator, and this holds good irrespective of the order in which the said means or the said discs may be mentioned in relation to the speed ratio between them.

When speaking of ratios the conventional vehicle nomenclature will be used according to which a "high ratio" means a high value of output velocity/input velocity, and a "low ratio" vice versa.

In a planetary gear arrangement such as that described in relation to the first regime it is possible to make the generalisation that any such gear arrangement which provides a zero over all ratio for the geared idling condition will have the output element of the train rotating in the same direction as that of the output element of the variable unit when the latter is in a higher ratio than the geared idling ratio and in the opposite direction when the variable unit is in a lower ratio than the geared idling ratio. It is a matter of choice which of these directions of rotation for the output element of the train is chosen as the "forward" direction and in a vehicle installation the choice is made by a suitable choice of the final drive. For instance, in the first and second embodiments shown in the drawings the lower ratios of the variable unit are chosen to provide the "forward" direction, whereas in the third embodiment, the opposite is the case. As the variable unit in the first and second embodiments, causes a reversal of rotation in relation to the input, the direction of rotation of the output element of the transmission system is the same as that of the input thereto, in the "forward" condition of the transmission system in the first regime. Therefore a conventional final drive to the road wheels may be employed.

As no great range of transmission ratios is required for the "reverse" condition, in a vehicle installation, it will be the forward condition which needs to be extended, in respect of increased ratio range, by the change-over to the second regime. This change-over is preferably arranged to take place at or in the vicinity of the extreme end of the ratio range of the forward condition of the first regime when the ratio of the variable unit is at its lowest. This ratio will be hereinafter called the "change-over ratio" of the variable unit. In the second regime the variable unit is connected between the input and output shafts of the transmission system with the planetary gear train inoperative. To maintain the forward direction of the vehicle therefore simple direction reversing gears must be inserted between the output of the variable unit and the output of the transmission system as a whole. When the change-over to the second regime has been accomplished further increases of overall ratio of the transmission system are accomplished by changing the ratio of the variable unit back in the direction of the ratio which, in the first regime was the geared idling ratio, and beyond that ratio into the range of variable unit ratios which provided the reverse condition in the first regime.

It is possible to choose the ratios of the planetary gear train and the other gearing employed in the transmission system so that the overall ratio thereof is the same in either regime when the variable unit is in the change-over ratio. If one imagines the change-over to be arranged by simple dog clutch devices, the first being capable of coupling the third element of the planetary train to the transmission system output to provide the first regime, and the second being capable of coupling the output of the variable unit to one side of the direction reversing gears the other side of which is permanently coupled to the transmission system output, then, to provide the second regime, when the change-over ratio is reached in the first regime, the two elements of the second dog clutch will be revolving at the same speed and can be engaged without the necessity of first disengaging the first dog clutch. The converse applies when changing down from the second regime to the first regime. It is thus possible to make a simple synchronous change between the two regimes without any interruption of the drive and with no discontinuity of ratio such as is encountered with a change of gear in a conventional gear box providing a number of different fixed ratios.

With this arrangement the change between the first and second regimes is accompanied by a change of the sense of the torque reaction in the variable unit and other things being equal a change in the magnitude of that torque reaction.

This arises from the fact that, at the change-over ratio in the first regime, for one unit of input torque there are $y$ units of output torque when $y$ is the overall torque multiplication of the transmission system at the change-over ratio. As the variable unit is providing the only fixed torque reaction member of the system, in the first regime its torque reaction is the difference between the input torque and the output torque, namely $y-1$, the input and output torques being in the same direction of rotation. In the second regime for 1 unit of input torque the output torque, ignoring the reversing train, is the same as in the first regime but the sign is negative due to reversal of rotation in the transmission unit. The torque reaction is again wholly supported by the transmission unit and is equal to $-y-(+1)=-(y+1)$.

With a variable unit of the type used in the illustrated embodiments, which has been briefly described above, changes of ratio are obtained by differentially changing the diameters on the respective toroidal faces of the discs engaged by the two sides of a roller. It is not practical to make this change by direct action and it is in fact well known to cause a roller to steer itself to a new ratio attitude by displacing its rotational axis from the equilibrium attitude in which it intersects the main axis, the geometry being such that the roller rotational axis moves back into intersection with the main axis in the course of or as a result of the change of ratio attitude. One way of initiating these ratio changes is to mount the roller with freedom of bodily movement in directions generally tangential to the torus centre circle at the roller centre. This is the direction in which the roller torque reaction force acts and provision is made to balance this torque reaction by application of a control force acting in the opposite direction. Where, as is usually the case, there are several rollers sharing the task of transmitting the drive from the input disc to the output disc the mountings of these rollers are coupled to a common source of control force, for instance by a system of levers coupling the individual roller mountings to a common thrust receiving member which is in turn coupled to a common source of control force, for instance a hydraulic actuator.

It is inherent in the geometry of such an arrangement that for a given sense of the torque transmitted by the variable unit the torque reaction at the rollers tends to displace the rollers in such a direction as to initiate a ratio change towards a lower ratio and it follows from this that the control force acts in a direction tending to initiate a ratio change towards a higher ratio. As torque reaction will change in sense on the changeover between the first and second regimes, arrangements must be made for the control force also to change in sense. For instance in the case of a hydraulic actuator it must be double-acting.

In the embodiment illustrated in FIGURE 1 the transmission unit is housed in a casing having three parts 1, 2 and 3 which are bolted together. The variable unit is contained in casing parts 1 and 2 and has two input discs 4 and 5 mounted on a shaft 6 and restrained from rotation upon the shaft in the case of disc 5 by a taper and in the case of disc 4 by splines or similar means (not shown) which permit a limited amount of axial sliding of disc 4 upon shaft 6. An output disc 7 is located between discs 4 and 5 and rotates on needle roller bearings 8 supported by a spider unit 9 anchored to the casing 1 by pins such as 10. A set of three rollers only one of which, 11, is visible in the drawing, provides driving connections between a toroidal surface of disc 4 and a similar toroidal surface on the side of disc 7 facing disc 4. A similar set of rollers only one of which, 12, is visible in the drawing, provides driving connections between a toroidal surface of disc 5 and a similar toroidal surface on the other side of disc 7, namely the side facing disc 5. All the rollers are similarly mounted. Roller 11 rotates on roller bearings journalled on a pin 13 anchored in a roller carrier 14. This roller carrier is connected by a swivel coupling to an outwardly extending limb of a rocker lever such as 15, which pivots about a pin such as 16 carried by a leg such as 17 of the spider 9. There are three sets of the assembly—spider leg 17, pin 16 and rocker 15—disposed symmetrically around the shaft 6 and one rocker supports the carrier (such as 14) of each roller (such as 11). The inwardly extending limbs of the three rockers (such as 15) are received in guide members (such as 18) in a common thrust receiving member 19 which is fast with a sleeve 20. When the variable unit is transmitting torque the rollers are all urged in the same rotational sense relative to the main axis in directions generally tangential to the torus centre circle at the respective roller centres. Corresponding tangential forces in the opposite sense are transmitted through the guide members such as 18 to the common thrust receiving member 19 tending to make them and the sleeve 20 rotate together about the main axis. This rotation is restrained by means of a lever 21 fast with the sleeve 20 which is coupled by a linkage (not shown) to the control shaft 22 below disc 4. Control shaft 22 is in turn coupled by means not shown to a hydraulic ram arrangement to be described in detail later in connection with the ratio control system. The rollers of the right hand set, such as 12, are mounted and controlled in a manner similar to the left hand set of rollers. A central sleeve 23 fast with the spider 9 extends to the right through the centre of disc 7 and provides a mounting for the inner race 24 upon which the needle rollers 8 revolve. A further rightward extension of sleeve 23 supports a right hand spider unit having arms such as 25 similar to the arms such as 17 of the left hand spider unit 9. Sleeve 20 is also extended to the right through sleeve 23 and beyond and secured to it there is a common thrust receiving member 26 (similar to 19) having guide members such as 27 cooperating with rockers such as 28, these rockers serving to support and control movements of the roller carriers such as 29 upon which are mounted the rollers, such as 12, of the right hand set of rollers.

When the variable unit is rotating, movements bodily of the rollers, for instance in the case of roller 11 in the direction of a line passing through the roller centre 30 and normal to the plane of the drawing, initiates a change of ratio attitude on the part of the roller in a manner previously explained, any such movement being of necessity accompanied by rotation of common thrust receiving member 19 and also a corresponding motion of the ram coupled to control shaft 22 by reason of the coupling (not shown) between the latter and lever 20. These motions of the rollers will take place when the torque reaction thrust applied through the rockers (such as 15 and 28) to the common thrust receiving members 19 and 26 and thence to the ratio control ram, do not exactly balance the force provided by the ram and it will be clear that such motions of the rollers can result either from a change in the torque transmitted by the transmission unit or a variation in the hydraulic pressure applied to the ram. The left hand input end of shaft 6 is journalled by means of needle roller bearings 31 in the end wall 2 of casing 1. A sleeve 33 acts as the inner race of this bearing and also as a spacer between a nut 34 engaging screw threads on the end of shaft 6, and a thrust collar 35.

The end load forcing discs 4 and 5 together to squeeze the two sets of rollers between the end discs and the centre disc 7, which is required to keep the rollers and discs in driving engagement, is provided by a cylinder member 36 and a piston member 37 which together provide a hydraulic ram, the former bearing against the thrust collar 35 and the latter bearing against the left hand surface of disc 4. Hydraulic fluid reaches the space between piston 37 and cylinder 36 via a drilling 38 which passes to the left through a sleeve 39 integral with cylinder 36 which is in turn surrounded by a carbon bush 40 secured in a block 41 anchored to the casing. Piston 37 and cylinder 36 with its integral sleeve 39 rotate with shaft 6 and the sleeve 39 is a tight fit on shaft 6 to prevent the leakage of hydraulic fluid from the cylinder space, entry of hydraulic fluid to which is provided via a union 42 and a pipe 43 which communicate with a radial drilling in block 41 leading to an internal groove in bush 40. Pipe 43 is of robust proportions and secures block 41 and bush 40 against rotation. When no pressure exists in the cylinder space piston 37 is "bottomed" in cylinder 36 and a relatively small pre-load is applied to discs 4 and 5 via Belleville washers 44.

The output from the variable unit is taken from the centre disc 7 via a drum 45, the open left hand end of which is notched to engage projections 46 formed on the outside of disc 7. The right hand end of drum 45 is secured to a flange integral with a sleeve 47 and this sleeve is journalled by means of a ball bearing 48 in the end wall 49 of casing 2. A central bore through sleeve 47 forms the outer race for needle rollers 50, 51, within which the right hand end of shaft 6 is supported, for rotation. The right hand end of sleeve 47 is attached to a composite planet pinion carrier having one branch 52 carrying planet pinions 53 and 54 both of which are fast with spindle 55 and another branch 56 which, by means of integral spindle 57, provides a carrier for planet pinions 58 and 59 which are integral with an interconnecting sleeve 60. Actually the branches 52 and 56 are not diametrically opposite as shown in the drawing but extend outward from the main axis in radial directions at right angles to one another and each has a duplicate branch, spindle, and pinion assembly diametrically opposite to it. However it is difficult to indicate this in a single drawing and FIGURE 1 is to this extent diagrammatic. Fixed to shaft 6 is a sun wheel 61 in mesh with planet pinion 58 and planet pinion 59 meshes with a further sun wheel 62, part of an assembly journalled by means of needle roller bearings 63 on an output shaft 64 which is in turn supported by ball bearings 65 in the end wall 66 of casing 3. A spigot end 67, part of shaft 6, is a running fit within a socket 68 in the left hand end of a shaft 64 so as to keep the two shafts in alignment. The tooth numbers of sun wheel 61, pinion 58, pinion 59 and pinion 62 are respectively 25, 35, 25, and 35 so as to provide a gear ratio between the first and last of approximately 2:1 with planet carrier 56 held stationary. Sun wheel 62 has a castellated extension 69 at its right hand end which may be engaged by internal castellations on a sleeve 70 which is axially slidable on similar castellations formed on the outer edge of a flange 71 integral with output shaft 64. Sleeve 70 is grooved to receive a pin on the lower end of a lever 72 pivoted to the casing 3 at 73 and pivotally attached at its upper end to a piston rod of a double acting piston cylinder actuator assembly 74. Two pipe unions 75 and 76 provide access to the respective ends of the assembly 74 and if fluid pressure is applied at union 75 sleeve 70 is driven to the left into engagement with the castellations on extension 69 so as to lock pinion 62 to output shaft 64 in which event the transmisson system will operate in the first regime. Pinion 53 has 25 teeth and is in mesh with a 35 tooth sun wheel 77 integral with a brake disc 78 which at its outer periphery carries friction rings 79 which are interleaved between a presser ring 80, an intermediate ring 81 and an annular piston 82, all three of which are anchored by external splines (not shown) to the casing 3. Annular piston 82 is housed in an annular cylinder 83, the cylinder space between the two being in communication with a union 84 so that when pressurised fluid is applied at union 84 the friction rings 79 and the brake disc 78 and sun wheel 77 are locked to the casing and in this event the transmission will be in the second regime provided that sleeve 70 is thrust to the right by pressurised fluid applied to union 76. Pinion 54 has 35 teeth and meshes with a 25 tooth sun wheel 85 secured to output shaft 64. With sun wheel 77 held stationary planet carrier branch 52 will be rotating with and at the same speed as the centre disc 7 and a simple calculation will show that the sun wheel 85 together with output shaft 64 will be driven at approximately the same speed as disc 7 but in the opposite direction. For these two speeds to be exactly the same the tooth ratios between planet pinion 53 and sun wheel 77 and likewise between sun wheel 85 and planet pinion 54 should be in the ratio $1:\sqrt{2}$ but is is difficult to achieve this ratio exactly with toothed wheels and in any event the difference is slight and of no moment.

It is intended that the flanged collar 86 secured to the left hand end of shaft 6 should be coupled to a prime mover and the right hand end of the shaft 64 to the cardan shaft or corresponding element of a vehicle.

Figure 2:
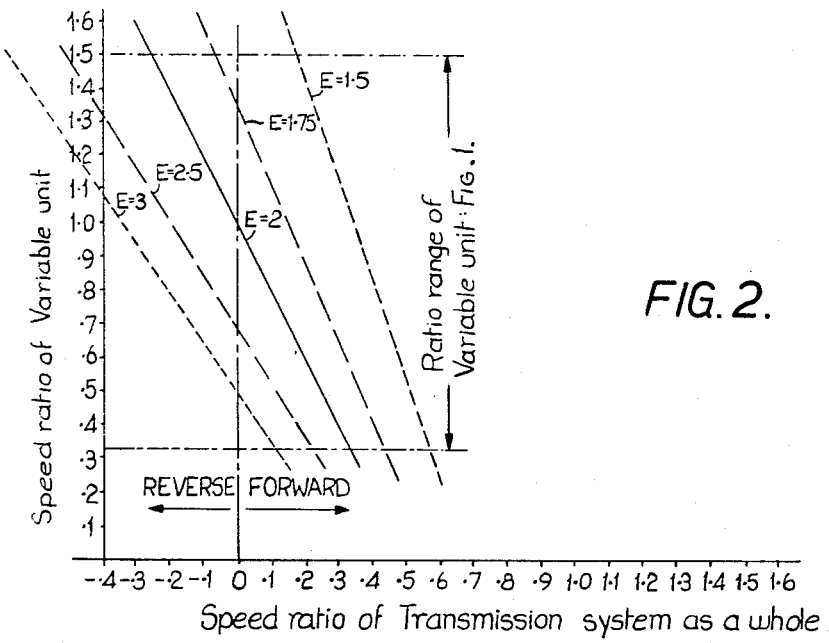
FIG. 2 is a graph illustrating the design factors for the said first embodiment in the first regime.

The considerations affecting the choice of gear ratios can be more readily appreciated from a study of FIGURE 2 which is a graph relating speed ratios within the variable unit (along the vertical axis) to speed ratios of the transmission system as a whole (along the horizontal axis). The vertical line passing through zero on the horizontal axis will be intersected at various points by a family of sloping lines each of which represents a different ratio, E, of the first regime planetary gear train 61, 58, 59, 62. The two horizontal chain dotted lines indicate the limits of the ratio range of the variable unit which extend at either side of the 1:1 ratio to a high gear of 1.5:1 at one extreme and a low gear of .33:1 at the other extreme. It is necessary to choose a value of E which, within the ratio range of the variable unit, will intersect the horizontal chain dotted line representing the highest ratio of the variable unit at a point representing, along the horizontal axis, a speed ratio adequate to provide a satisfactory range of REVERSE ratios and at the same time providing at its intersection with the lower horizontal chain dotted line corresponding to the lower ratio of the variable unit, a forward ratio of the transmission system as a whole which is substantially equal to the lowest ratio of which the variable unit is capable. For any given overall torque multiplication range for the transmission system as a whole other factors enter into the choice of E ratio and if it is necessary for these reasons (which will be explained in detail later) that the highest forward ratio in the forward direction of the first regime does not exactly match the lowest forward ratio in the second regime (that is to say the lowest ratio of the variable unit) then it is possible to translate the ratio range of the second regime by suitable manipulation of the ratios of the second regime gear train 77, 53, 54, 85. In the case of the FIGURE 1 embodiment the ratio E of the first regime gear train was chosen as $E=2$ giving reverse ratios up to a maximum of .25:1 and forward ratios of up to .33:1, in the first regime, and the latter ratio exactly matches the lowest ratio of the variable unit in the second regime. The slight discrepancies between the actual ratios of the first regime train and the second regime train and the theoretical 2:1 ratio cancel out so that the change-over ratio is slightly greater than .33:1.

Figure 3:
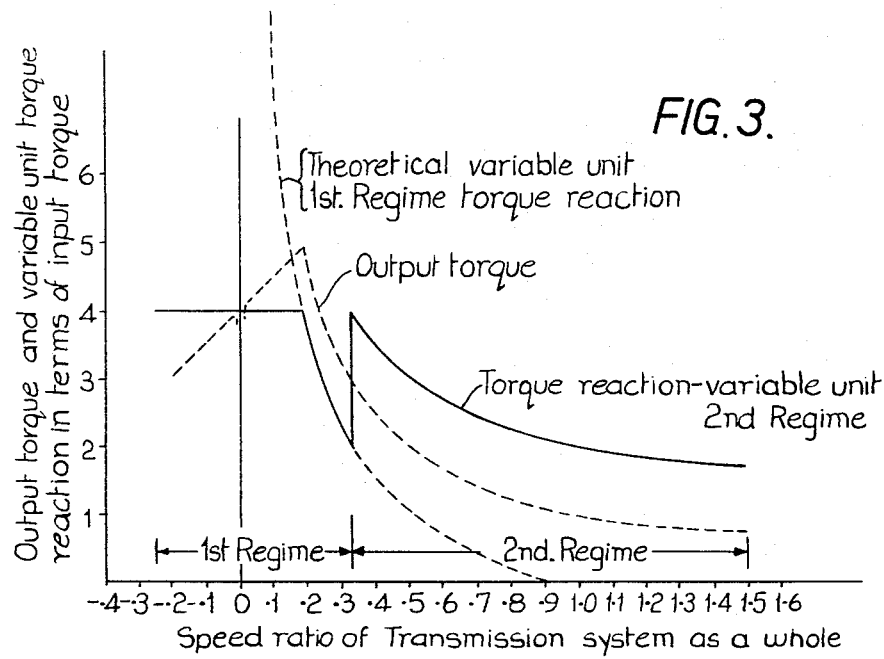
FIG. 3 is a graph of torques arising in both regimes, for the said first embodiment.

Some of the considerations governing the choice of E ratio for the first regime gear train can be seen from FIGURE 3 which is a graph showing, for the FIGURE 1 embodiment the relationship between the speed ratio of the transmission system as a whole plotted along the horizontal axis and the torque reaction of the variable unit in terms of the input torque from the prime mover, plotted along the vertical axis.

In the second regime the variable unit is providing the sole torque reaction member both between the prime mover and the load and its torque reaction follows the normal characteristic for such variable units, that is to say it is equal to the sum of the input torque and the output torque so that at the lowest ratio of .33:1, for one unit of input torque there will be three units of output torque and the sum, namely four times the input torque, represents the torque reaction. In the highest ratio of the variable unit, namely 1.5:1 for one unit of input torque there will be ⅔ of a unit of output torque and the torque reaction will be 1.66 times the input torque. Between these extreme points the characteristic is curved downwardly. For any given design of variable unit the most important factor governing life is the maximum torque reaction to be encountered since the end load providing the driving engagement between discs and rollers needs to be proportional to the torque reaction and the life of the variable unit is to a large extent limited by the maximum end load applied. Having chosen the dimensions and materials of the variable unit to withstand the maximum low gear torque conditions it is logical that this should be used as a ceiling for the torque loads to be applied in the first regime. In the case of the FIGURE 1 embodiment this is four times the maximum input torque of the prime mover with which the transmission system is to be used. If the torque reaction operating at various ratios in the first regime is calculated it will be seen that it follows the dotted line curve of FIGURE 3 rising very steeply towards infinity at zero overall ratio of the transmission unit. It is a simple matter, however, to protect the variable unit from these excessive torques which would obtain in the region close to zero overall ratio by limiting the maximum pressure which can be applied to the ratio control actuator coupled to shaft 22 of FIGURE 1 so that when the torque reaction tends to rise above the force represented by the limiting actuator pressure, the rollers of the variable unit move over and steer themselves in the direction of a lower ratio relieving themselves of torque reaction in the process. It will be clear that if the fuel supply to the prime mover was maintained under these conditions the variable unit would run back towards the geared idling ratio and the prime mover would race away. This would feel to the driver like a slipping clutch. Provided the vehicle was not locked against forward motion, however, it would nevertheless accelerate. This is illustrated by the dotted line curve representing total output torque superimposed on FIGURE 3. It will be obvious that for overall ratios of the transmission system above .2:1 (in the forward direction) the output torque will be equal to the input torque multiplied by the overall ratio and over this range of ratios the full input torque of the prime mover can be utilised. The torque curve of FIGURE 3 can be regarded as valid for any input torque over this range of ratios. When considering ratios below .2:1 in the forward direction the torque reaction curve must be regarded as being applicable only to maximum input torque conditions, and the levelling off of the torque reaction curve is produced by limiting the ratio control actuator pressure for the variable unit so that the torque-reaction balancing force from that actuator cannot exceed the value which just balances the torque reaction obtaining at the change-over ratio, in the second regime when the full design input torque is applied. For the design parameters of the FIGURE 1 embodiment this provides .½=5 times the input torque at .2:1 overall ratio in the first regime which is the highest output torque obtainable. The overall ratio corresponding to the knee of the torque reaction curve where the horizontal section intersects the first regime theoretical torque reaction curve thus corresponds for all practical purposes to the lowest gear of a conventional gear box. If for the values of FIGURE 3 the resistance to motion of the vehicle calls for an output of more than five times the designed maximum input torque to overcome it, the vehicle will come to rest, if previously moving, say up a hill of increasing gradient. When moving from a standing start a lower resistance to movement will prevent a start being made. It can be shown that the torque available for starting from rest is equal to four times the maximum design input torque. If, as previously explained, the variable unit torque reaction in the first regime is equal to the input torque ($T_{ip}$) multiplied by the overall ratio ($y$), minus the input torque, then the maximum *usable* input torque is $$\frac{4}{y-1}$$

when the torque reaction is limited to 4 $T_{ip}$ max. by limitation of the maximum ratio control actuator pressure. Consequently the output torque is given by the equation $$T_{op} = \frac{4}{y-1} \times y$$

If this is plotted for values of $y$ below 1/2 ($y$ being the overall torque multiplication ratio—equal to the reciprocal of the overall speed ratio) then it will be found that the maximum available output torque falls linearly from five times maximum input torque at .2 overall speed ratio, to 4 times the maximum input torque at the zero or geared idling ratio.

Theoretically of course there can be no output torque at all in the geared idling ratio but this case cannot arise so long as the input *speed* is high enough to drive the fluid pump, which provides pressurised fluid to the ratio control actuator, is high enough for the output of this pump to reach the limiting pressure. The reason for this is that zero output torque is accompanied by zero torque reaction in the variable unit and if the limiting pressure is applied to the ratio control actuator, the resulting force, not being opposed by a torque reaction of corresponding magnitude, will cause the rollers of the variable unit to change ratio in the sense such as to raise the overall speed ratio above the zero ratio. To all intents and purposes therefore the output torque curve can be considered as a straight line from five times input torque at .2 overall ratio to four times input torque at zero ratio, and similar calculations show that this line continues at the same slope beyond the zero ratio into the REVERSE range.

The behaviour of the system when starting from rest can be appreciated by considering the limiting case where "full throttle" is suddenly applied to the prime mover. Four times full design input torque will immediately become avialable as output torque and will produce a corresponding rate of acceleration of the vehicle. The engine speed would rise with the output speed until the maximum torque engine speed was exceeded, the input torque would then fall off and likewise the variable unit torque reaction which would then fall below that necessary to balance the limiting ratio control actuator pressure. A rise in overall speed ratio would result and the engine speed would fall back to the maximum torque condition but at this higher overall ratio, a *higher output torque would become available*. This process would continue until the overall speed ratio of .2 was reached. If a hill was then encountered requiring five times maximum design input torque to keep the vehicle moving, the vehicle speed and the overall ratio would not exceed maximum torque engine speed and .2 respectively. If no change of load occured however, with the engine still at full throttle, the ratio would rise, the engine speed would be "pegged" at the maximum torque speed and the output torque would fall along the dotted line accompanied by increasing vehicle speed.

Figure 4:
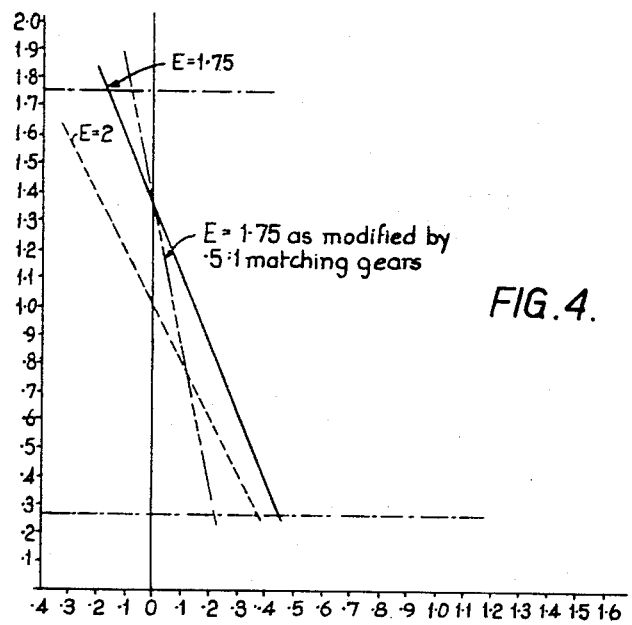
FIG. 4 is a graph illustrating the design factors for the second embodiment of the invention, in the synchronous form, in the first regime.
Figure 5:
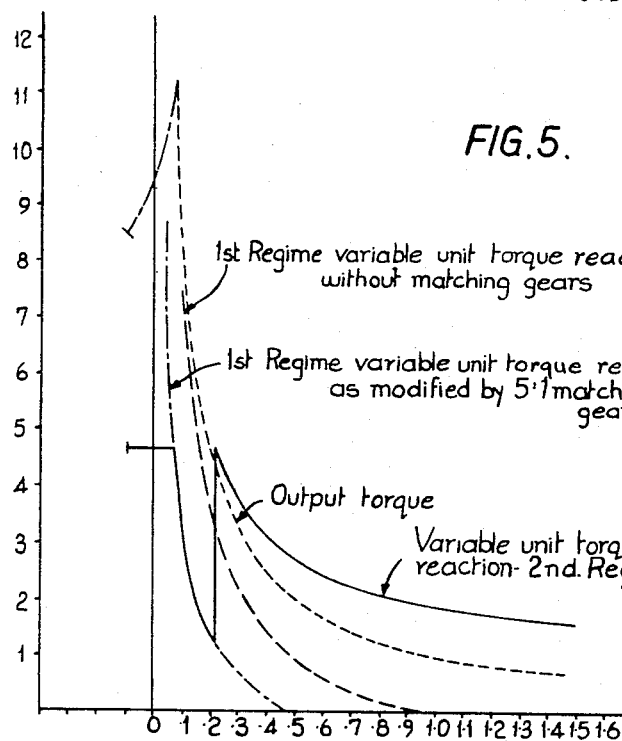
FIG. 5 is a graph of torques arising in both regimes, for the said second embodiment.
Figure 6:
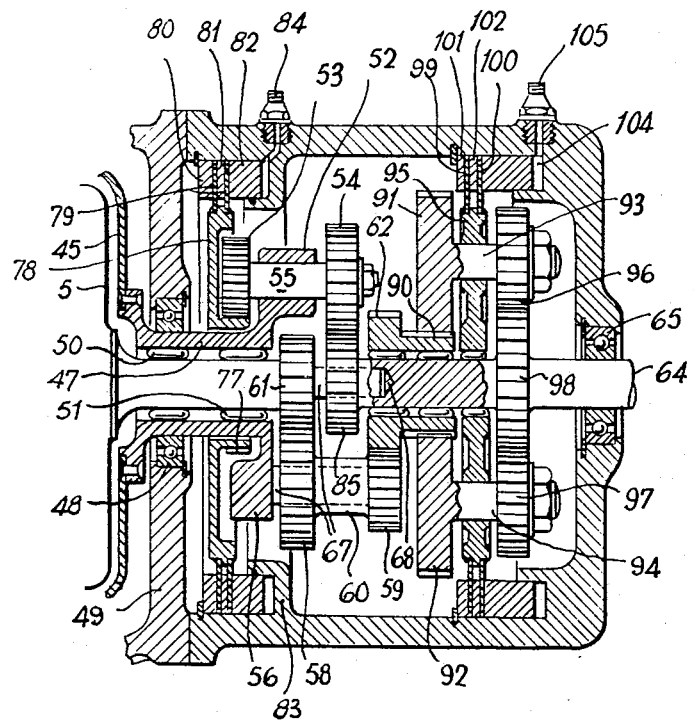
FIG. 6 is a section along the main axis of variants of the said first embodiment necessary to convert it to the said second embodiment of the invention.

The construction of the second embodiment of the invention is shown in FIGURE 6 but the *rationale* of its design can more readily be understood from a description of FIGURES 4 and 5 which correspond to FIGURES 2 and 3 respectively.

This embodiment is designed for use with a heavy vehicle where the largest practicable range of torque multiplication ratios is required for a given ratio range in the variable unit, with less stringent requirements as to speed ratio range in the REVERSE condition. Some increase of the overall ratio range of the variable unit has been provided, particularly at the high ratio end of the range of the variable unit, which provides the reverse condition in the first regime. As this high ratio would give an unnecessarily high ratio in the second regime a reduction gear train with the ratio 6:7 is included in series with the variable unit in the second regime. This gives an overall ratio range of .228:1–to–1.5:1 for the second regime and the former is the change-over ratio. The actual variable unit ratio range is .266:1–to–1.75:1.

To obtain the maximum torque multiplication range in the forward direction in the first regime an E ratio of 1.75 is chosen, this gives a variable unit geared idling ratio of 1.35:1 which permits a maximum reverse ratio of approximately .2 (or 5:1 reduction). The corresponding limit of overall forward ratio would be .46 which does not match the lowest ratio, .228, of the second regime. The full line curve of FIGURE 4 represents an E ratio of 1.75. It is possible to alter the slope of this curve by adding a reduction train between the first regime planetary train and the output shaft of the transmission system but it will be noticed that the variable unit ratio giving the geared idling condition will remain unaltered. Considering the highest overall forward ratio of .46 (without reduction gears), it can be seen that a reduction of 2:1 changes this ratio to .23, which is very close to the lowest second regime ratio of .228. Accordingly a reduction gear of 2:1 ratio is added as a matching train between the first regime planetary train and the transmission system output. The chain-dotted line of FIGURE 4 represents the effect of this.

Turning now to FIGURE 5 the dashed-line curve represents the variable unit torque reaction in the first regime, without matching gears. This is independent of the E ratio (being a function of the overall torque multiplication ratio, as previously explained) and is the same as the dashed line in FIGURE 3. With the 2:1 matching trains added however, the overall speed ratio values, for given variable unit torque reaction values, are halved. This means that for any given variable unit torque reaction, the overall torque multiplication, in the first regime, is doubled. The dotted line represents output torque in terms of input torque, for various overall speed ratios.

As in the FIGURE 1 embodiment the maximum torque reaction in the second regime (in this case 4.6 times input torque) is chosen as the limiting torque reaction and the ratio control actuator is "pegged" at the corresponding pressure. The horizontal part of the firm line, passing through zero overall ratio into the reverse range, represents this "pegging" of the ratio control pressure. The knee of this curve, where the horizontal line joins the chain dotted line, represents the lowest speed ratio at which full input torque can be utilised. This ratio is slightly below .1, i.e., a more than 10:1 torque multiplication. This provides a ceiling output torque of approximately 11.2 times the designed maximum input torque. The maximum output torque available from a standing start works out at approximately 9.3 times maximum designed input torque and in reverse falls with rising speed ratio to about 8.46 times maximum designed input torque at the limiting reverse speed ratio of about .09.

These values are obtained from the equation:

$$Top = \frac{Tr\ max.\ X\ Rmt\ y}{y-1}$$

where $Top$ is the max. available output torque, $Tr$ max. is the designed limiting value chosen for the variable unit torque reaction, $y$ is the overall torque multiplication ratio=(1/speed ratio), and $Rmt$ is the torque multiplication ratio of the matching train.

It will be seen that the introduction of the matching gears has enabled the maximum available output torque, for a given limiting variable unit torque reaction, to be doubled. In other words the effective lowest gear ratio for which maximum input torque can be usefully applied is lowered by the step-down ratio of the matching gears.

A range of forward ratios from 11.2:1 reduction to 1.5:1 overdrive, in which full input torque can be utilised, is thus provided. A certain penalty is incurred in the form of a lowering of the highest reverse speed ratio from about 5:1 (reduction) to about 11:1. From a standing start in reverse the maximum available ouput torque falls with rising speed ratio from 9.3 to 8.4 times the designed max. input torque. In practice this limits the speed attainable in reverse (no bad thing in a heavy vehicle) and limits that gradient that can be tackled in reverse from the requiring 11.2 times the designed maximum input torque (available in forward driving) to that requiring slightly less than 9.3 times the designed maximum input torque and that is only available in the lowest reverse ratios.

The structural variations as between the first embodiment illustrated structurally in FIGURE 1 and the second embodiment illustrated in FIGURE 6, essentially concern only the casing part 3 and its contents. Minor modifications are, however, required to the variable unit shown in FIGURE 1 to increase its overall ratio range slightly but this involves only relatively small extensions of the inner and outer extremities of the toroidal faces on the discs and is well within the capability of those skilled in the art. Corresponding items in FIGURES 1 and 6 have the same reference numerals in both figures. The gear trains illustrated in FIGURE 1 remain unaltered except that the tooth numbers of the reversing train, sun wheel 85, planet pinion 54, planet pinion 53 and sun wheel 77 are changed to 26 teeth, 36 teeth, 26 teeth and 36 teeth respectively to provide the 7:6 step down ratio in the second regime. The tooth numbers of sun wheel 61, planet pinion 58, planet pinion 59 and sun wheel 62 are changed to 25 teeth, 33 teeth, 25 teeth and 33 teeth respectively. The dogged flange 71 on the output shaft 64, the ring 70 and its operating lever 72 and actuator 74 are omitted together with the fluid supply unions 75 and 76. The dogged flange 69 integral with sun wheel 62 is relaced by a sun wheel 90 having 25 teeth. A pair of planet pinions 91 and 92 mesh with sun wheel 90 and each has 35 teeth. Planet pinions 91 and 92 are integral with spindles 93 and 94 journalled in a planet carrier 95. Further planet pinions 96, 97 having 25 teeth each are fast with spindles 93 and 94 respectively and mesh with a 35-tooth sun wheel 98 which is fast with the output shaft 64. The planet carrier 95 has a splined circular rim carrying two internally splined friction plates 99 and 100 which are interleaved between a presser plate 101, an intermediate plate 102 and an annular piston 103 these three latter items being restrained from rotation relative to the casing part 3 by means not shown. The annular piston 103 is housed in an annular cylinder 104 similar to annular cylinder 83 and access for the supply of fluid to the cylinder space is obtained via a union 105.

When pressurized fluid is applied via union 105, the friction plates 99 and 100 are gripped and the planet carrier 95 is restrained from rotation. In this condition the first regime is provided and it will be observed that the operation is the same as that described in relation to FIGURE 1 except that the planetary train 61, 58, 59, 62 has an E ratio of approximately 1.7:1 and that the gear train 90, 91/92, 96/97 and 98 operates as a series matching train with a step down speed ratio of approximately 2:1. The slight discrepancy between the actual ratios of the second regime reversing train and the first regime planetary train and matching train, as compared with the design values mentioned above in connection with FIGURES 4 and 5, arise from an attempt to provide a convenient size of gear tooth. The main result of the discrepancies is to alter slightly the change-over ratio and the shapes of the curves of FIGURES 4 and 5. The slight discrepancy between the theoretical E ratio of 1.75 and that actually obtained with the gear tooth members specified in relation to FIGURE 6 will involve a slight alteration in the ratio which the variable unit must take up to provide the geared idling condition.

The mechanical aspects of the sequence of operations in changing from the first regime to the second regime and vice versa, will now be briefly explored in relation to the FIGURE 1 embodiment.

When the overall ratio is rising in the first regime the sun wheel 77 is idling, driven by planet pinion 53 whose companion pinion 54 is meshed with sun wheel 85, fast with the output shaft whilst the carrier is rotating with the variable unit output sleeve 47. As the change-over ratio is approached, the brake plate assembly 78, 79 will be rotating at a gradually decreasing speed and when the change-over ratio is reached it will be stationary. The output/input speed ratio of the variable unit itself is falling during this time and reaches or closely approaches the extreme end of its range, at the change-over ratio. If now the brake cylinder 83 is pressurized, there is a gear connection from the input shaft to the output shaft via gear wheels 61, 58, 59, 62 with the carrier arm 56 as the reaction member, and this in turn is coupled to the output shaft via pinions 85, 54, 53 and 77. The latter is held by the brake 78 . . . 84.

The variable unit is bridged across part of this geared connection. If the ratio of the variable unit itself were to fall below the change-over ratio it would relieve or "back-load" the reversing train and if it were to rise above the change-over ratio it would relieve or "back-load" the planetary train.

In the former case, the torque reaction would be in the normal direction for the first regime and would increase with further falling of the variable unit ratio. This would initiate a ratio change back towards the change-over ratio. In the latter case the torque reaction would be in the reversed sense and would also give rise to a ratio change back toward the change-over ratio.

If now the control pressure is removed from the ratio control actuator the rollers are governed entirely by the torque reaction and it is a feature of the geometry of the variable unit used in the embodiments of FIGURES 1 and 6 that a torque reaction positions the rollers to initiate a change of ratio in the sense tending to reduce the torque reaction. Therefore the rollers automatically adjust themselves to the change-over ratio where the variable unit is unloaded.

The next step is to apply the control pressure, at an increased level to the other side of the ratio control actuator (assuming that a single double-acting actuator is issued). This is the sense in which the actuator tends to raise the ratio of the variable unit and this, as previously indicated relieves or back-loads the first regime planetary train and loads the reversing train in the second regime condition.

If now pressure is applied to pipe union 76, sleeve 70 is thrown to the right to disconnect the first regime. Should the ratio vary before this is done to an extent such as to load the dogs 69, 70, 71 the torque reaction thrown upon the variable unit will be in the sense such as to initiate a lowering of the ratio towards the change over ratio and in the course of seeking equilibrium the dogs will be unloaded permitting them to be disengaged by actuator 74 even if this is not powerful enough to disengage the dogs under load.

The sequence of energising brake cylinder 83, disconnecting and changing over the ratio control actuator pressure and then energising actuator 74 to disengage the first regime dogs 69, 70, 71, is effected by a valve means which may be damped to introduce a time delay between the successive steps of the sequence. This sequence may be triggered by a device actuated on a slight contra rotation of disc 78 after the same has come to rest on reaching the change-over ratio in the first regime. It is preferably arranged that the sequence once triggered, cannot be interfered with until it is completed by the release of dogs 69, 70, 71.

Apart from the case where the vehicle is allowed to come to rest at the wish of the driver for which case special provision is made, the change back into the first regime from the second regime is required to take place in response to an enforced lowering of the overall ratio under full input torque and an increasing load (for instance when the vehicle encounters a steep hill). The control system is such that (apart as aforesaid) it is only under these conditions that the second regime ratio will fall to the change-over ratio. When this happens the sequence of change-over operations is similar to that occurring on the change from the first regime to the second regime, mutatis mutandis. In this case however the dogs 69 and 71 are both rotating, but at different speeds.

As the change-over ratio is approached these speeds will approach equality and eventually a reversal of sense of differential rotation will start. This can be caused to trigger the change-over after a small part of a revolution of reversed relative rotation.

In the embodiment of FIGURE 6 the signal for reversion to the first regime can be obtained from the brake plate assembly 95, 99, 100 in the same way as the signal for the transition into the second regime is obtained from brake plate assembly 78, 79.

An alternative means for obtaining the regime-transition signal is to provide a mechanism operated from some part of the roller support structure, for instance one roller carrier such as 14 in FIGURE 1. This would involve some form of ratchet mechanism which would, in alternate operations thereof, switch a control valve first one way then back the other way. It should preferably be arranged that the roller would have to recede a certain relatively small distance from the change-over ratio attitude, and in the rising ratio direction, before the change-over mechanism could be cocked for reoperation. This "hysteresis" margin should just exceed any fluctuation of the ratio attitudes of the rollers which might occur during the actual inter-regime transition interval.

Another approach to the problem of control is illustrated in FIGURE 7.

In FIGURE 7 a Demand Valve 101 has an outer element 102 movable up and down in a housing 103 under control of an engine-driven governor 104. An inner element in the form of a spool 105 is accommodated within a central bore in element 102 and slides up and down within that bore under control of the demand member represented as a "go" pedal 106. A resilient connection in the form of a sliding collar 107 and springs 108 provide the coupling between "go" pedal 106 and a push rod 109, integral with spool. Element 102 and spool 105 together form a conventional 3-land 5-port valve adapted to connect a central pressure port 110 to one or other of two intermediate delivery ports 111 or 112 the one not so connected being connected to one or other of two outer drain ports 113, 114.

In FIGURE 7 high pressure supply points are denoted by a dot with a circle and drain or sump connection points by a trident symbol.

With element 102 and spool 105 in the relative positions shown in the drawing the pressure feed port 110 and both the drain ports 113 and 114 are covered by lands of spool 105. This represents the positions of element 102 and spool 105 when the engine is a little above its normal idling speed and the "go" pedal 106 is fully released. When the engine speed falls back to idling speed, element 102 is in a position a little lower, in relation to spool 105, than that shown in the drawing so that ports 111 and 113 are in communication. Ports 112 and 110 may also be in communication but this is not essential. The drawing shows spool 105 and element 102 in their normal running equilibrium relative positions. If the engine idling speed adjustment is arranged by means which affect the rest position of pedal 106 an automatic compensation of the demand valve, for changes of idling speed adjustment, is effected.

The delivery ports 111 and 112 are connected to three ports 117, 118 and 119 of a Low-Hold and Reverse Follower Valve 120, the functions of which will be described later. Port 111 is connected to both port 117 and 118 and port 112 is connected to port 119 via a Reverse Guard Valve 121, the functions of which will be described later. Normally the three-land spool 122 of valve 120 is in the position shown in the drawing putting port 119 into communication with a delivery port 123 and port 118 into communication with another delivery port 124. Ports 123 and 124 are connected respectively via a Neutral Valve 115 the functions of which will be described later, to ports 125 and 126 of a Cam Actuator 127 which contains a piston 128 mounted on a piston rod 129.

Two cams, Ratio Cam 130 and Change-Over Cam 131 are fixed to an upper extension of piston rod 129. Ratio Cam 130 has an upstanding control edge 132 which is engaged by two cam-follower rollers 133 mounted on a push rod 134 which forms the input member of the follow-up servo system for controlling the ratio of the variable unit. This servo system comprises a five-port/three-land-spool Ratio Servo Valve 135 and a Ratio Actuator 136. Actuator 136 has a piston 137 connected by a piston rod 138 to the ratio controlling linkage of the variable unit and movements to the right increase the ratio of the variable unit itself whilst movements to the left lower that ratio.

Ratio Servo Valve 135 has a ported outer body 139 capable of axial movement to the right when the ratio of the variable unit rises and to the left when that ratio falls. To provide this movement, body 139 may either be coupled to piston rod 138, or, alternatively, it may be coupled to one of the roller carriers so that it moves when the associated roller executes a change of ratio attitude.

Fluid pressure is applied, via a Torque Limiting Valve 140 and a Dump Valve 141 (the functions of which will be explained later), to a central port 142 of the Ratio Servo Valve, two outer ports 143 and 144 being connected to drain or sump. Two intermediate ports 145 and 146 are connected to the left and right hand ends respectively of the Ratio Actuator 136. If push rod 134 is moved to the right relative to body 139 pressurised fluid passes from port 142, via port 145 to force piston 137 to the right to raise the ratio of the variable unit; if push rod 134 is moved to the left pressurised fluid passes from port 142 via port 146 to force piston 137 to the left; similarly corresponding relative movements caused by movement of body 139 have the same effect.

In operation a movement of push rod 134 results in a corresponding movement of piston rod 138 and the ensuing change of ratio, or the movement of piston rod 138 itself, (according to the manner in which body 139 is coupled to the variable unit), cancels the relative displacement of body 139 and the spool 147 within it, at a new equilibrium ratio setting corresponding to the initial movement of push rod 134.

Piston rod 138 is subjected to torque reaction forces within the variable unit which are balanced by fluid pressure in actuator 136. Should this balance be disturbed, for instance by a change of torque reaction, so that the ratio changes without movement of push rod 134, valve body 139 will move relative to spool 147 in a sense such as to cause actuator 136 to restore the ratio of the variable unit to what it was before the disturbance.

So long as the fluid pressure source is connected through to port 142, therefore, the ratio of the variable unit "follows" the postion of push rod 134.

The drawing shows Ratio Cam 130 in the position corresponding to the geared idling ratio of the variable unit. To avoid the necessity of extremely accurate manufacture and assembly of the Ratio Cam 130, Ratio Servo Valve 135, Ratio Actuator 136 and the ratio-determining parts of the variable unit itself, a Dump Valve 141 cuts the fluid pressure feed to valve 135 in this position of the Ratio Cam 130 by reason of its cam follower, 148, falling into a cavity 149 in the back edge of Cam 130. This disables the Ratio Actuator 135 and leaves the rollers of the variable unit free to hunt for the true geared idling ratio which they will do automatically, as previously explained.

When the engine is idling and the "go" pedal is released the spool 105 is biased slightly upwards in relation to the position shown in FIGURE 7 and if this biasing is not sufficient to uncover port 110 port 113 will nevertheless be uncovered to permit the lower end of cam actuator 127 to exhaust itself via port 126, neutral valve 115, and ports 124, 118, 111 and 113, under the influence of a spring 174 which is shackled by a sleeve 175 so that it can urge Ratio Cam 130 to the geared idling position but no further. If the bias of spool 105 is rather greater, port 110 will be uncovered and the Cam Actuator 127 will be pressurised at the upper end and the Ratio Cam hydraulically urged downwards. The ratio of the transmission unit as a whole will fall until the Reverse Guard Valve is operated by cam lobe 150. This ensures that the transmission unit will revert to the first regime and to the geared idling condition of that regime, when the vehicle comes to rest in positions of the selector rod 158 other than N or neutral position on the selector quadrant.

If now the "go" pedal is sharply depressed the spool 105' of the Demand Valve puts port 110 into communication with port 112 (if not so already). Fluid pressure then appears at port 112 and, but for the insertion of the Reverse Guard Valve 121 between port 112 and port 119, the upper side of Cam Actuator 127 would be pressurised and the Ratio Cam 130 would move downwards from the geared idling position. This would move push rod 134 in the direction which raises the ratio of the variable unit and, the first regime being engaged, the vehicle would move backwards instead of forwards. The Reverse Guard Valve prevents this and prevents actuator 127 from operating at all until the engine speed rises to make Demand Valve body 102' overtake spool 105', whereupon port 110 is put into communication with port 111 so that fluid pressure passes via ports 118, 124, neutral valve 115 and port 126 to the lower side of actuator 127. Cam 130 then rises and first Dump Valve cam follower 148 rises out of notch 149 whereupon Dump Valve 141 opens the path from the fluid pressure supply source to Ratio Servo Valve 135. Push rod 134 will have been carried a small distance to the left by the rising of Ratio Cam 130 and as soon as fluid pressure becomes available at port 142 of valve 135 the ratio of the variable unit itself will start to fall. This produces a rise in the overall ratio of the transmission system as a whole since it is in the first regime.

First regime is engaged because brake cylinder 104 (FIGURE 6) is pressurised via first regime valve 152, whilst pressure is withheld from brake cylinder 83 by second regime valve 153.

The resilient coupling of "go" pedal 106, by means of collar 107 and springs 108 to spool 105 of Demand Valve 101 protects the latter from excessive loads which might be applied to it by the "go" pedal since the travel of spool 105' in valve body 102' is limited to ensure that the former cannot be moved out of reach of the ports it is supposed to control.

The speed of the engine for any given setting of the "go" pedal will be determined by the resistance to motion of the vehicle and the ratio of the time being of the transmission system. If, in the ratio then obtaining, the engine torque exceeds the resistance fed back to it through the transmission system the engine speed will increase and governor 104' will lift valve body 102' relative to spool 105'. This opens a path for pressurised fluid from port 110, via ports 111, 118 neutral valve 115 and port 126, to the lower end of actuator 127. The effect of this is to raise Ratio Cam 130 which lowers the ratio of the variable unit but raises the overall ratio, till the resistance fed back to the engine rises towards balance with the engine torque. The rise of engine speed is arrested by this process but equilibrium is reached when the engine speed is such that the outer body 102' and the inner spool 105' of Demand Valve 101' are substantially in the relative positions in which they are depicted in FIGURE 7. Should the engine speed fall too far the upper end of actuator 127 would be pressurised and the Ratio Cam would descend and lower the overall ratio.

The operation of the system can be summed up in the statement: the "go" pedal setting demands a certain engine speed and the demand valve operates Ratio Actuator 127 and Ratio Cam 130 to adjust the ratio of the variable unit to such an overall ratio for the transmission as a whole as will permit the engine to attain and cause it to maintain the demanded speed, having regard to the resistance to the motion of the vehicle at any time and having regard to the torque available from the engine itself.

If the vehicle resistance does not reach balance with the engine torque by the time the overall ratio has been raised to the top of the range available in the first regime the Demand Valve will continue to feed pressurised fluid, via ports 111, 118, 124 and neutral valve 115 to the lower side of actuator 127 and the Ratio Cam will continue to ascend until cam follower rollers 133 reach a straight central position of cam track 132. At the same time, Change-Over Cam 131 presents a step 155 to the cam follower of a Second Regime Valve 153, whereupon brake cylinder 83 is pressurised via Second Regime Valve 153 so that both regimes are in operation together. Fractionally later in the upward course of cam 130, Dump Valve cam follower 148 encounters another notch 156 in the back edge of cam 130 and the pressure feed to Ratio Servo Valve 135 is again cut off, permitting the variable unit to hunt for the true synchronous "change-over" ratio, irrespective of the precise location of push rod 134.

Spool 147 has only a limited range of movement in valve body 139 so that it cannot move out of reach of the ports it is supposed to control but the free movement is amply sufficient to accommodate the small adjustments of ratio which may be necessary to obtain equilibrium at the change-over ratio when Dump Valve 141 is closed. Fractionally later again Change-Over Cam 131 presents a step 157 to the cam follower of First Regime Valve 152 which then cuts off the fluid supply from brake cylinder 104 so that the first regime is relinquished. Approximately simultaneously with the release of brake 104 (if anything slightly earlier), Dump Valve cam follower 148 rises out of notch 156 and the pressurised fluid is re-admitted to Ratio Servo Valve 135. Previous to this the variable unit was running light and, on release of brake cylinder 104 it will encounter the full second regime torque reaction tending to drive piston 137 to the left. Simultaneously or a little before this, pressure is admitted to valve 135. The position of spool 147 is, within small limits, indeterminate. If it is to the right of the central position the left hand end of actuator 136 will be pressurised and this will be the correct side to balance the torque reaction which has been reversed by the change to the second regime. If it is to the left of the central position the pressure will be admitted to the right hand side of actuator 136 and will aid the torque reaction in urging the variable unit towards its lowest ratio which will already obtain because the change-over ratio is the lowest ratio of which the variable unit is capable. The variable unit will therefore be driven against its low end stops. However the engine speed will continue to rise if the torque at the driving wheels exceeds the vehicle resistance as the conditions will be the same as obtain with a normal stepped gear transmission held in a fixed gear. The bottom end of Cam Actuator 127 will continue to be pressurised and the cam 130 will continue to rise. The reversed slope of the lower parts of cam track 132 will thus cause spool 147 to move to the right whereupon the variable unit ratio will be raised to move it from its low-ratio end stops.

Continued excess of torque at the driving wheels will result in a continued rise of cam 130 and a continued rise in the ratio of the transmission system as a whole.

It has been stated that the "go" pedal provides maximum fuel supply to the engine at an early stage of its downward travel. Full engine torque cam therefore be assumed to be available over a large part of the operating cycle of the vehicle whether the pedal is fully depressed or only partly depressed. If in the course of acceleration in the second regime the point is reached where the vehicle resistance fed back through the transmission system approaches maximum engine torque any further rise in ratio would slow down the engine and cause the demand valve to deliver pressure via port 112, Reverse Guard Valve 121, and ports 119, 123, neutral valve 115 and port 125 to the upper end of actuator 127 causing a fall in ratio. This process causes the engine speed to stabilise at a value such as to position spool 105' centrally as shown in the drawing, that is to say at the speed demanded by the "go" pedal.

The selection of various required conditions of the transmission system is controlled by a manually operated Selector Lever 158 movable over a range of positions denoted F, for normal forward driving, L for various degrees of "low hold," N for neutral and R for reverse marked on a slotted quadrant 116. Linked to lever 158 is a push rod 159 the upper end of which carries a slotted link 161 in which rides a follower on the push rod extending from the spool of a Low-Hold and Reverse Valve 162. Integral with slotted link 161 is a cam follower 163 engaging the rear edge of Change-Over Cam 131 and this rear edge has a step 164 part way along its length. When cam follower 163 is encountered by step 164, valve 162 is operated to connect the lower end of spool 122 of the Low-Hold and Reverse Follower Valve 120, to the pressurised fluid supply with consequences to be described below. With lever 158 in the F position, cam follower 163 is out of reach of step 164 in all positions of the ratio cam 130. When lever 158 is in one of the L positions, cam follower 163 will be encountered by step 164 at some position of Ratio Cam 130. This may be arranged to take place only when cam followers 133 of the ratio servo valve 135 are engaging the cam track 132 below the dwell section 154 and when second regime is in operation, but this is not essential; it may be arranged, by suitable location of the markings on the selector quadrant for follower 163 to be encountered by step 164 whilst the first regime is in operation in certain L positions of lever 158.

When in the course of a rise in ratio in the second regime, step 164 causes operation of valve 162, spool 122 of follower valve 120 is forced upwards against spring 165 which bears against the upper surface of a piston extension 166 which is coupled to and of larger diameter than spool 122.

The cylinder 167 in which piston 166 is accommodated communicates with a port 168 in Demand Valve housing 103 and this port is normally uncovered for the escape of fluid from cylinder 167 by means of a flat 169 on demand valve body 102'. When spool 122 is driven upwards the signals from the Demand Valve are reversed in sense before application to actuator 127 so that the ratio begins to fall, in conditions of the demand valve that would otherwise have called for a rise in ratio. This fall of ratio proceeds until the step 164 recedes from cam follower 163 causing valve 162 to close again and spool 122 to revert to normal (as shown in the drawing). A hunting action between cam 131, valve 162 and valve 120 will take place tending to prevent the ratio rising beyond a value corresponding to the setting of lever 158 within the range of L positions.

Should L be selected at a high road speed, over-speeding of the engine is prevented by a groove 170 in body 102' of Demand Valve 101', which connects a port 171, itself connected to the pressurised fluid supply, to port 168, thus admitting pressurised fluid into cylinder 167. The larger diameter of piston 166 provides a downward force exceeding the upwards force provided by the smaller diameter of the lower end face of spool 122 which is thus driven downwards into its normal position as shown in the drawing.

Before R can be selected lever 158 must pass through the N position which necessitates a leftward motion of the lever 158 into a neutral gate 182. Preferably the boss 183 which provides the pivot for lever 158, is spring-urged by spring 184 into gate 182.

A neutral bar 185 is engaged and operated by boss 183 when lever 158 moves leftward into gate 182. Neutral bar 185 is pivoted at 186 and when operated it rotates clockwise so that one extension 187 engages a supplementary follower roller 188 of first regime valve 152 and/or the follower of second regime valve 153 (which is extended for the purpose) so that these two valves are held in or moved to their cut-off conditions whatever the attitude at the time of change-over cam 131. Another extension 189, of Neutral Bar 185 lowers the spool of Neutral Valve 115, the effect of which is to block the two ports 190 and 191 (connected to ports 123 and 124 of the Low-Hold and Reverse Follower Valve 120) and to connect together ports 192 and 193 (connected to ports 125 and 126 of the Cam Actuator 127).

The purpose of Neutral Bar 185 and its functions as described is to enable the transmission system to be restored to the geared idling condition should the engine be stalled by emergency braking when in the second regime. The selection of N disables the connections through the first regime and second regime gear trains, at valves 152 and 153 and the neutral valve frees the cam actuator 127 from hydraulic restraint. The engine may then be restarted to rotate the variable unit and energise the Ratio Servo Valve 135 from pump 177 and the Ratio Cam 130 is then returned to the first regime and the geared idling position therein, by spring 174. The ratio of the variable unit will be changed in conformity with the Ratio Cam movement by means of servo valve 135 and Ratio Actuator 136.

Further movement of lever 158, to the R position disengages the neutral bar 185 and brings cam follower 163 beyond the step 164 for all positions of the Ratio Cam so that valve 162 is held open and spool 122 is raised. The signals from Demand Valve 101' will now have the opposite effect on Cam Actuator 127 from that previously described in relation to forward drive conditions and the vehicle will move off in reverse in response to depression of the "go" pedal. The Reverse Guard Valve 121 in the changed position of spool 122, now inhibits an initial upward movement of piston 128, thus preventing the vehicle from moving forward when lever 158 is in the R position. It has already been explained that the variable unit is protected against overload, in the lower overall ratios (forward or reverse) of the first regime. This is achieved by means of the Torque Limiting Valve 140 which bleeds the pressurised fluid supply to Ratio Servo Valve 135 when the pressure exceeds the predetermined maximum. When this happens the Ratio Servo Valve 135 can no longer control the ratio of the variable unit which seeks an equilibrium between the torque reaction at the rollers and the fixed maximum pressure available at Ratio Actuator 136. Valve body 139 is under control of the variable unit ratio which exerts forces greatly exceeding anything which Cam Actuator 127 can exert through cam 130, and unless the latter happens to be in a corresponding position, spool 147 will reach one of its end stops in valve body 139 and any further movement of the latter will pull cam 130 into a position approximately corresponding to the ratio assumed by the variable unit. For this to be possible the slope of cam track 132 must be such that it can cooperate reversibly with cam follower rollers 133, otherwise the forces capable of being applied to push rod 134 from the variable unit are sufficient to destroy the cam assembly.

As either side of Ratio Actuator 136 may carry the control pressure from which it is proposed to derive the end load pressure within cylinder 36 (see FIGURE 1) it is necessary to supply the latter with pressurised fluid via an End Load Shuttle Valve 176, having end ports connected respectively to the two ends of actuator 136 and a central port connected to cylinder 36. A ball rides in a central bore of valve 176, between the end ports and closes the end port which communicates with that one of the ends of actuator 136 which carries the lower pressure and puts the other end of actuator 136 (which carries a pressure sufficient to balance the torque reaction within the variable unit), into communication with the end load cylinder 36. When Dump Valve 141 cuts off the pressure from Ratio Servo Valve 135 there is no pressure available for end load cylinder 36 and reliance is placed on the preload spring washers 44 (see FIGURE 1).

Two pumps are provided to act as the pressurised fluid supply source namely an Input Pump 177 coupled to the input to the transmission system, and an Output Pump 178 connected to the output of the transmission system. A Pump Shuttle Valve 179, similar to shuttle valve 176 receives the outputs of both pumps and connects the pump delivering the higher pressure to an output port supplying the various pressure supply points of the control system, which are indicated diagrammatically by the array of supply point symbols 180.

Output Pump 178 is capable of generating its full pressure at slow speed but the maximum pressure it can deliver is limited to a value below the normal delivery pressure of Input Pump 177 by means of a Shunt Valve 181 which bypasses the delivery from pump 178 during normal running so that little power is consumed by it. Pump Shuttle Valve 179 isolates pump 178 from the supply points of the control system under these conditions so that Shunt Valve 181 does not limit the pressure delivered by Input Pump 177. The principal purpose of Output Pump 178 is to furnish pressurised fluid to the control system under conditions when the engine is stopped or running too slowly for Input Pump 177 to supply adequate control pressure. This is desirable, inter alia, to ensure that engine braking is available on resumption of movement down a hill after a check during which the engine has been allowed to slow down or has been stalled, without the need to accelerate or restart the engine to energise either the first regime brake or the second regime brake, both of which will be released on the slowing down of the engine and the Input Pump 177. The vehicle will then have its driving wheels disconnected from the engine and resumed motion of the vehicle cannot, of itself, accelerate pump 177. Output Pump 178 however will start to deliver pressure as soon as the vehicle moves and will re-energise the control system and restore the drive between the engine and the road wheels. When Input Pump 177 has been accelerated sufficiently it will restore Shuttle Valve 179 to its normal condition and cut off Output Pump 178.

To adapt the control system illustrated in FIGURE 7 to the embodiment of the invention as shown in FIGURE 1, First Regime Valve 152 requires to be modified so that it has two delivery ports one connected to the pressure source in one condition of the valve and the other connected to the pressure source in the other condition, these two outlet ports being connected respectively to pipe unions 75 and 76.

An "asynchronous" embodiment of the invention will now be described in relation to FIGURES 8, 9, 10 and 11.

Figure 8:
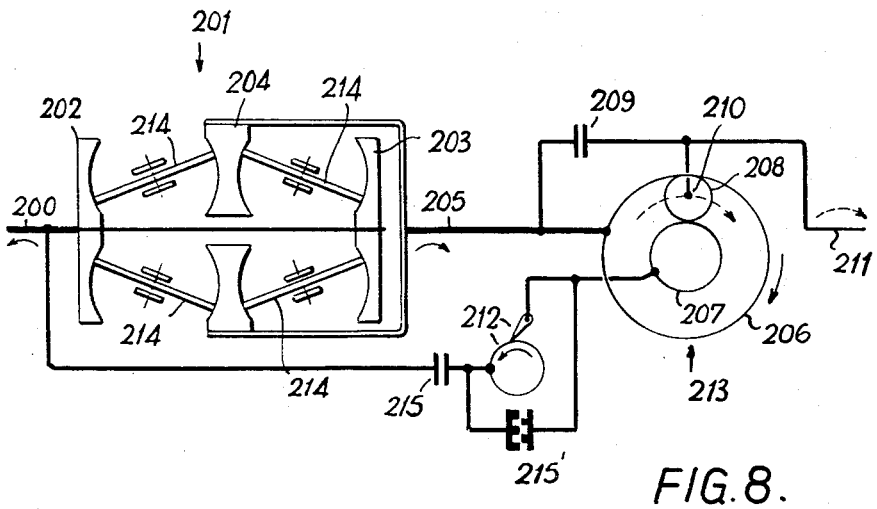
FIG. 8 is a schematic diagram of a third embodiment of the invention, in the asynchronous form.

The schematic diagram of FIGURE 8 enables the basic components and their manner of working, to be readily appreciated. This diagram makes use of the following conventions.

A planetary gear train is represented as a sun-planet-annulus epicyclic gear train by two concentric circles representing the sum and the annulus respectively, with a third circle tangent to the other two, representing a planet gear. A shaft connection to a gear wheel rotating with the shaft is shown as a line terminating in a dot on the circumference of the circle representing the gear wheel and a shaft connection to a planet carrier is shown at a line terminating in a dot in the centre of the circle representing a planet gear mounted on the carrier. A clutch or brake is represented by short thick parallel lines representing a shaft or the like, is connected or disconnected by the clutch or brake. This symbol is the same as that used to denote a capacitance in an electrical circuit. A unidirectional clutch (herein referred to as "sprag") is represented by a circle or an arc of a circle, and a wedge (indicating a pawl) the slope of which indicates the direction of engagement of the sprag.

As shafts and gears may rotate in one direction in some circumstances and in the opposite direction in other circumstances, arrows are used to denote the directions of rotation of the elements in circumstances which are specified in the description. The symbol used to indicate a toroidal race variable ratio transmission unit is self-explanatory. Referring to FIG. 8 an input shaft 200 is connected to a prime mover. A variable unit 201 has two input discs 202 and 203 which are fast with input shaft 200, and an output disc 204 fast with the variable unit output shaft 205, which is in turn fast with the annulus 206 of a planetary gear train having a sun wheel 207 and a planet wheel 208.

Shaft 205 is also coupled, via a clutch 209, to the planet carrier 210 (represented by the dot at the centre of planet wheel 208) and planet carrier 210 is fast with the output shaft 211 of the transmission system as a whole. Input shaft 200 is connected (through a clutch 215, the purpose of which will be described later, and which is normally engaged when the transmission system is transmitting torque) to one element of a sprag 212, the other element of which (shown as a pawl) is connected to sun wheel 207.

The prime mover rotates in one direction only (anti-clockwise). Shaft 200, discs 202, 203 of the variable unit 201 and one element of sprag 212 are permanently coupled to the prime mover and therefore rotate with it.

Disc 204 of variable unit rotates in the opposite direction from discs 202, 203 (that is to say clockwise), and annulus 206 being connected to it also rotates clockwise, as shown by the arcuate arrows. When the transmission unit is in a condition such as to drive the load in the direction which can for convenience be described as "forwards," output shaft 211 and carrier 210 will be rotating clockwise, as shown by the dotted arrows.

For the first regime clutch 209 is disengaged. Annulus 206 is driven clockwise. The load connected to shaft 211 tends to hold carrier 210 stationary and if the latter did in fact not move sun wheel 207 would be driven anticlockwise at the speed of annulus 206 multiplied by the annulus/sun ratio, or E ratio of the planetary gear train (generally denoted 213), the direction of torque transmission being such as to cause sprag 212 to be engaged, unless input shaft 200 should happen to be revolving faster than sun wheel 207. When the variable unit 201 is set to a speed ratio, output/input, equal to the reciprocal of the E ratio of gear train 213, no torque will be applied to carrier 210 nor to output shaft 211 and the transmission system will idle. This is called the "geared idling" condition. If the ratio of variable unit is raised, the speed of annulus 206 will rise and sun wheel 207 will tend, through sprag 212, to drive shaft 200 at a faster speed than that of input discs 202, 203. This it cannot do without driving output disc 204 and annulus 206 faster still, through the rollers 214 of the variable unit 201. The result is that carrier 210 and output shaft 211 are driven clockwise, at an overall transmission system ratio which rises as the variable unit ratio is further adjusted in the same direction. When the end of the ratio range, in this direction, of the variable unit is reached the overall ratio of the transmission unit, from shaft 200 to shaft 211 will be substantially less than that of the transmission unit because the rotation of input shaft 200 and sun wheel 207 is in the opposite direction from that of annulus 206.

If at this point clutch 209 is engaged, carrier 210 is locked to annulus 206 and the whole gear train rotates as one so that sun wheel 207 will have its direction of rotation reversed from anti-clockwise to clockwise, and sprag 212 is disengaged.

When clutch 209 is engaged the overall ratio of the transmission system is that of the variable unit; a much higher ratio than obtained before engagement of clutch 209. It is arranged that the latter ratio corresponds with a ratio at or near to the lower end of the ratio range of the variable unit and the ratio control system for the variable unit is arranged so that, on engagement of clutch 209, the ratio of the variable unit is quickly changed from the high end of its range to the low end whereby the overall ratio after engagement of clutch 209 becomes the same as was the overall ratio previous to the engagement of clutch 209.

A large part of the ratio range of the variable unit is now available for providing a continuing rise in the overall ratio. This is the second regime.

When the ratio is required to fall, in the second regime, a point near the lower end of the ratio range of the variable unit is reached and then clutch 209 is disengaged to bring about the conditions of the first regime. This point in the ratio range of the variable unit may be below the geared idling ratio, and were it not for the presence of sprag 212 in the connection between shaft 200 and sun wheel 207, the speed of the latter, in relation to the speed in the reverse direction of annulus 206 would be such as to drive output shaft 211 in the "reverse" direction (i.e. anti-clockwise). This would impose a temporary load on the transmission system until the ratio of the variable unit was changed to a higher synchronous ratio. Due to the present of sprag 212 however, the inner member (indicated by the circle) overruns the outer member (indicated by the wedge), in the anti-clockwise direction and the sprag does not transmit torque. As sun wheel 207 is required, in the first regime, to act as a torque reaction member to prevent mere idle rotation of planet wheel 208 on its pivot on carrier 210, there is no torque applied to output shaft 211 until the ratio of the variable unit is raised to the ratio at which the speed of annulus 206 is greater than that of sun wheel 207 by an amount sufficient to give the same overall ratios as obtained prior to the release of clutch 209. It is arranged that this ratio shall be at or near to the "high" end of the ratio range of the variable unit and the ratio control system is organised to sweep the ratio of the variable unit to this new ratio as quickly as possible on removal of the torque reaction load from the variable unit resulting on release of clutch 209.

When the transmission system is in the first regime with the variable unit in the geared idling ratio, the load may be driven in the "reverse" direction by changing the ratio of the variable unit in the direction of the lower limit. This occurs when sun wheel 207 rotates anti-clockwise at more than E times the clockwise speed of annulus 206. Under such conditions the torque is applied at the sun wheel and the annulus 206 supports the torque reaction by lagging behind the peripheral speed imposed by sun wheel 207 on planet wheel 208. Sprag 212 will not transmit the required torque from shaft 200 however as it is wrongly oriented for this purpose, and this is a protection against driving the load in the reverse direction when it is desired to drive it in the forward direction, should the ratio of the variable unit for any reason be below the geared idling ratio. To obtain "reverse" therefore the sprag 212 is locked by means of a dog-clutch 215 which is allowed to engage when an appropriate selection member of the control system is operated to a "Reverse" condition.

The control system is arranged so that the transmission system returns to the geared idling condition when the vehicle is brought to rest in the ordinary way. In this condition the output shaft cannot be rotated. To enable the vehicle to be towed it is therefore necessary to disconnect the transmission system at some point. This is done by means of a further clutch 215' interposed between shaft 200 and sprag 212 and it may be arranged that this clutch is engaged and disengaged in dependence on the absence or presence of pressure in a hydraulic end load cylinder of the variable unit.

An actual mechanical design based on FIG. 8 will now be described in relation to FIG. 9.

Figure 9:
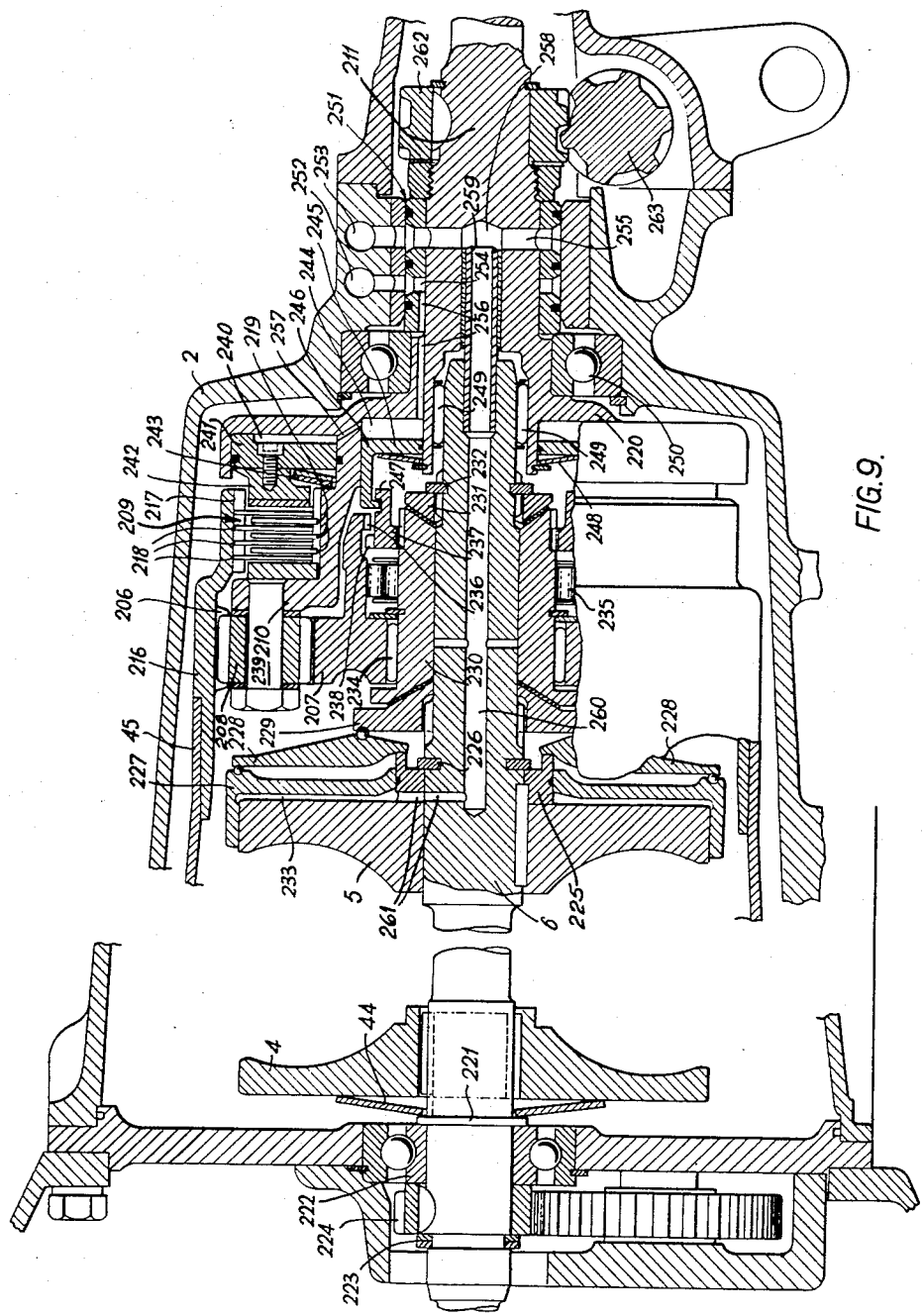
FIG. 9 is a section along the main axis, of the mechanical parts of the said third embodiment of the invention.

The variable unit 201 is similar to that shown in FIG. 1 so that it has not been drawn in detail in FIG. 9 in which the reference numerals of FIG. 1 have been used for corresponding items the nature and functions of which are not described again except where they differ from those of FIG. 1.

The drum 45 which picks up the drive from centre disc 7 (not shown in FIG. 9) is fixed to a cylindrical member 216 integral with annulus 206 and an internally splined member 217, forming part of clutch 209 and supporting one set 218 of annular friction plates interleaved with another set of similar plates 219 supported in turn on splines on a member 220 which combines the functions of planet carrier 210 and output shaft 211 (inter alia).

The left-hand end of the variable unit is different from FIG. 1 in that there is no hydraulic end-load cylinder at that end, disc 4 being keyed to shaft 6 but slidable thereon and urged to the right by a preload spring corresponding to spring 44 of FIG. 1 and so numbered. Spring 44 bears against a shoulder 221 on shaft 6 which also locates the inner race of a ball bearing 222 the other side of which is clamped against shoulder 221 by a spring clip 223, which also holds in position a gear 224 forming part of an "input pump" corresponding in function to pump 177 of FIG. 7.

The reaction of spring 44 is transmitted through the rollers and centre disc (not shown in FIG. 9 but corresponding to rollers 11 and 12 and disc 7 of FIG. 1), to disc 5 which is prevented from moving to the right along main shaft 6 by a thrust ring 225 and a spring clip 226.

Disc 5 forms the piston of a hydraulic end load arrangement comprising a cylinder 227 sealed against the outer rim of disc 5 and the outer surface of thrust ring 225.

The right-hand outer edge of cylinder 227 bears against a number of symmetrically disposed thrust augmenting levers such as 228, the inner ends of which bear against an extension flange of thrust ring 225. A coned member 229 makes contact with the right-hand side of lever 228 a little distance outward from the inner end of the latter. Coned member 229 is splined to main shaft 6 but slidable axially thereon. A sleeve member 230 is free to rotate on shaft 6 but is trapped between coned member 229 and a coned thrust ring 231 also splined to main shaft 6 but restrained against movement axially to the right by a spring clip 232. When there is no pressure in the working space 233 between disc 5 and cylinder 227, the two coned members 229 and 231 do not grip sleeve 230.

When pressure is admitted to space 233, cylinder 277 is urged to the right and lever 228 augments the force applied to cylinder 227 thrusting to the left against disc 5 through thrust ring 225 and bearing to the right against coned member 229 which acts as a fulcrum. The force representing the pressure in space 233 multiplied by the effective piston area, is thus augmented enabling lower pressure to be used. When end load thrust is applied through lever 228 to thrust ring 225 the load is removed from spring clip 226 and transferred to spring clip 232, sleeve 230 being effectively locked to main shaft 6 at the same time. Also preload spring 44 is fully compressed so that it is in effect in series with the hydraulic end load device 5, 227, 228, 229, 225 and is only effective to determine the end load when the latter is not providing enough thrust to compress the former. With the parts arranged in this way the end load applied by spring 44 does not lock sleeve 230 to main shaft 6 in the absence of pressure in space 233.

The assembly, coned member 229, sleeve 230 and coned thrust ring 231 together constitute clutch 215' of FIG. 8.

Sun wheel 207, is supported on needle roller bearings 234 between its inner bore and the outer surface of sleeve 230. A tubular extension of sun wheel 207 is of larger internal diameter than the portion forming the outer race for bearings 234 and there is an enlarged annular space between it and sleeve 230 in which are housed figure-of-eight sprag elements 235 oriented to transmit torque when the sun gear 207 is revolving in the same direction as main shaft 6 and tending to revolve faster. This direction will be constant in the application for which the present embodiment was designed, since the prime mover is presumed to be capable only of unidirectional rotation. This direction will be anti-clockwise as viewed from the right.

Also integral with sun wheel 207 is a ring of internally directed dogs 236, separated from sprag elements 235 by a space relieved at least to the depth of the roots of dogs 236. A ring member 237 is slidable on splines on sleeve 230 but rotates with the latter. Dogs 238 extend outwardly from member 237 and are capable of engaging dogs 236 when member 237 is moved to the right, or being freed from connection with them when moved into the relieved zone to their left. Planet carrier 210 supports a planet spindle 239 on which is mounted planet wheel 208. Integral with planet carrier 210 is a structure to the right thereof which, in addition to supporting clutch plates 219, provides an annular cylinder 240 in which there is housed an annular piston 241 secured to a pressure ring 242, the assembly 241, 242 being forced to the left to engage clutch 209 when fluid under pressure is admitted to cylinder 240; otherwise a push-off spring 243 holds clutch 209 disengaged.

Radially inwards of cylinder 240, there is another annular cylinder 244, housing an annular piston 245, which has an extension 246, which engages a corresponding extension 247 of ring member 237 so that they may rotate independently of one another but move together axially of the main shaft.

When pressurised fluid is introduced into cylinder 244, a push-off spring 248 is compressed and ring member 237 is driven to the left to the position shown in the drawing. Spring 248 is relatively weak so that a very slight pressure suffices to compress it. Dogs 236, 238 constitute a dog clutch 215 of FIGURE 3 and they are only required to be engaged for the "reverse" condition of the transmission system. The fluid supply to cylinder 244 is then cut off by means to be explained. Under all other running conditions it is arranged that sufficient pressure exists in cylinder 244 to hold dogs 236, 238 disengaged as shown in FIG. 9.

The end of main shaft 6 extends within the output shaft 211, (which, as has already been explained, is integral with planet carrier 210) and is supported therein by needle roller bearings 249. Shaft 211 is is turn supported in the main casing 2 by means of a ball bearing 250, beyond which, and to the right a tunnel extension of the man casing 2 houses a fuel supply slip ring arrangement 251 by which two main fluid supply points 252 and 253 communicate respectively with two circumferential grooves 254 and 255.

Groove 254 communicates through a fluid passage 256 with cylinder 244 which in turn communicates via a passage 257, with cylinder 240.

Groove 255 communicates with a central bore 258 in shaft 211. A sleeve 259 provides a bridge between bore 258 and a coaxial bore 260, in the end of main shaft 6, which extends to the left to the region of disc 5 where it is joined by radial fluid passage 261 extending through thrust ring 255 into the end loadng cylinder space 233.

A further extension to the right, of output shaft 211, carries a skew gear 262 meshed with a skew gear 263 which, in turn drives a pump corresponding to output pump 178 of FIG. 7.

The control system for the third embodiment of the invention is shown in FIG. 10. The system has much in common with that illustrated in FIG. 7 and the reference numerals for corresponding items are the same in both figures.

A demand valve 101′ under combined control of a "Go" pedal 106, and an engine driven governor 104′ is again used and it differs only from the corresponding valve of FIG. 7 in the omission of ports 168 and 171 and valve connection grooves 169 and 170, these items, in the control system of FIG. 7, being provided to prevent over speeding of the engine under "low-hold" condition at high road speeds. This is dealt with in a different manner in the FIG. 10 system.

The Ratio Servo Valve 135 is shown as being accommodated within the piston rod of Ratio Actuator 136 which is the equivalent of one form of the FIG. 7 arrangement (i.e. that in which valve body 139 of the Ratio Servo Valve 135 is directly coupled to piston rod 138 of the Ratio Actuator 136). Piston 137 tends to "follow" movements of spool 147.

Ratio Cam 154 of FIG. 7 is eliminated and the piston rod 128 of Cam Actuator 127 is directly connected to push rod 134 of Ratio Servo Valve 135 through a lever 265 fulcrumed at an intermediate pivot 266, the position of which can be changed by means of a Regime Actuator 267 from a 1st Regime position 268 to a 2nd Regime position 269. In FIG. 10 the item corresponding to Cam Actuator 127 of FIG. 7 is re-named "Pilot Actuator" but reference numeral 127 is retained.

The Selector Quadrant differs considerably in design and operation from that shown in FIG. 7 and different reference numerals are used for its parts in FIG. 10.

Selector Quadrant 270 of FIG. 10 has four settings: R (Reverse), N (Neutral), D (Drive) and a range of settings L (Low Hold), arranged in that order, from the bottom, as shown in the drawing. The Selector Lever 271 has a fulcrum upon a plunger 272 which is urged upwards by a spring 273. Between its ends lever 271 is coupled to the spool 274 of a Selector Valve 275 which has 7 lands the upper three of which performs functions analogous to those of spool 122 of the Low Hold and Reverse Follower Valve 120 of FIG. 7 and the ports co-operating with these three upper lands have the same references as are used in FIG. 7. The function of the lower parts of Selector Valve 275 have no precise equivalence to FIG. 7. Spool 274 has limited travel, being arrested at one end by spring clip 276 and at the other end by spring clip 277.

In the N position of lever 271 ports 123 and 124 are in communication with ports 117 and 118 and as these latter are externally connected, so also are the former and as these lead to the two ends of the Pilot Actuator 127 the piston 128 is free to move. In the D position of lever 271, port 124 still communicates with port 118 but port 123 now communicates with port 119. The lower end of Pilot Actuator 127 is connected through to port 111 of the Demand Valve 101′ and the upper end to port 112 of the Demand Valve, via a Reverse Guard Valve 121 in FIG. 7, is given the same reference numeral in FIG. 10.

When Selector Valve 274 is in the R position the connections between the Pilot Actuator 127 and the Demand Valve 181 are reversed in the same way as occurs when spool 122 of Valve 120, in FIG. 7, is raised.

The explanation of the remaining functions of selector valve 274 will be deferred until other parts of the system have been described.

The Input Pump 177 and the Output Pump 178 are similar to those described in FIG. 7. There is a Pump Shuttle Valve 278 which performs the function of the similar valve 179 and of Output Pump Shunt Valve 181 of FIG. 7.

Valve 278 has a spool with two end faces respectively subjected to the pressures from the two pumps and with two lands separated by a waist which, when the pressure from Input Pump 177 predominates, interconnects the output of sump 178 to a low pressure point on the hydraulic circuit which may be the inlet to the lubrication ducts of the mechanical parts of the transmission system. A lower output port is in communication with the high pressure parts of the control system under these conditions. The Spool of valve 278 is lightly biassed downwards to isolate the Input Pump 177 from the control system at low engine speeds and at such times (also when output pump 178 predominates), output pump 178 is connected to the high pressure parts of the control system.

The waist of the spool at such times interconnects Input Pump 177 to the lubrication system but the pump 177 is able to overcome the bias spring on the spool when the engine speed is raised despite the drain through the lubrication system.

The high pressure outlet from Pump Shuttle Valve 278 passes to the Torque Limiting Valve 140 and thence branches three ways: First, to a port 280 of the Selector Valve 275. Port 280 is blocked by land 281 of spool 274 when lever 271 is in the N position but in all other setting of the lever port 280 is in communication with another port 282 which leads to the Ratio Servo Valve 135, with tappings to three other valves to be later explained.

Second, to a low pressure valve 283, having two-land spool spring-urged to a position in which the high pressure entry port is opposite the waist of the spool. The low pressure outlet port is at the end of the valve body remote from the spring and there is a leak past or through the spool into this end from the high pressure entry port. Pressure builds up in this end of the valve body and if it exceeds a value determined by the strength of the spring, the spool recedes to blank off the high pressure entry port until the pressure in the end connected to the low pressure output port falls again, a constant pressure (subject to a small fluctuation because the valve will hunt in operation) is maintained at the low pressure output port. This pressure may be of the order of 10 lbs. per sq. in.

Third, to a medium pressure valve 284, of the same type as valve 283 but set to deliver a somewhat higher pressure which may be of the order of 25 lbs. per. sq. in. The spring of valve 284 holds the spool in the upward position at which it blocks the medium pressure output port, when the pressure supplied to the valve is below the low pressure. This ensures the quick build-up of low pressure from valve 283.

The low pressure outlet port of valve 283 is connected to a port 285 of selector valve 275 which is between lands 286 and 287 of spool 274, and in communication with a port 288 for all positons of lever 271 except the R position when port 285 is covered by land 286 and a port 289, connected to the sump is uncovered by land 287 so that port 288 is drained. Port 288 is connected to a Regime Shift Valve 290 which, in the 1st Regime, feeds the low pressure from valve 283 to cylinder space 244 (FIG. 9) to uncouple dogs 236, 238 except when reverse is required, and then cylinder space 244 is drained by interconnection of ports 288 and 289 of selector valve 275 as previously explained, so that piston 245 moves to the right to engage dogs 236, 238. The low pressure is admitted to cylinder space 240 when it is admitted to cylinder space 244, because of passage 257, but it is too low a pressure to compress push-off spring 243 to engage clutch 209.

The output of Medium Pressure Valve 284 is connected to port 110 of Demand Valve 101' and provides the pressure to control Pilot Actuator 127.

Pilot actuator piston 128 rises and Ratio Servo Spool 147 falls to produce a rise in the ratio of the variable unit 201.

To provide the reverse condition of the transmission system the variable unit ratio must fall below the geared idling ratio, in the 1st Regime. At this ratio, piston 128 of Pilot Actuator 127 is on a position nearer to the lower than to the higher end of its stroke (it is shown in such a position in FIG. 10). If it were to rise the vehicle would move off forwards instead of backwards. This could happen if the "go" pedal were to be sharply depressed after selection of R, because the demand valve would interpret this initially as an unrequited demand for a high engine speed calling for a rise in ratio above the geared idling ratio. This same problem is encountered with the FIG. 7 system and its details have already been outlined. The same remedy of providing a Reverse Guard Valve 121 has again been adopted, to cut the pressure feed to the lower end of the Pilot Actuator 127 when it is at the geared idling position by means of a cam lobe 150 coupled to the Pilot Actuator Piston Rod 129. When D is selected the corresponding problem does not arise since sprag 212 will not permit the vehicle to be driven backwards. The Reverse Guard Valve nevertheless operates to disconnect the upper side of the Pilot Actuator 127 from the Demand Valve 101' and to open it to sump, as it acts in this way naturally and there is no reason for arranging that it works only when R is selected.

When, after selection of D the Demand Valve 101' is delivering a pressure to the lower end of Pilot Actuator 127, a point is reached, in the 1st Regime, when the ratio of the variable unit is close to the "high" end of its range. There is a changeover cam 131, in the form of a portion of increased diameter, at the lower end of piston rod 129. This engages and operates in succession a First Regime Valve 152 and a Second Regime Valve 153. The order of operation of these valves is different according to whether the overall ratio is rising or falling. In either case, the first to change its state prepares for the regime change and the second to change its state brings about the change. The valves are each named according to the change of regime they bring about when changing state after the other has prepared for the change.

The Regime Shift Valve 290 has a spool 291 with spaced lands 292, 293, 294 and 295 and a spring loaded detent mechanism, generally indicated as 296, which tends to hold spool 291 at one end or the other of its range of movement except when it is positively moved. The spool 291 is shown in the drawing in the "1st Regime" position. The valve is actuated by applying pressure to the end face of land 292 or of land 295, by means respectively of 1st Regime Valve 152 or 2nd Regime Valve 153.

When piston rod 129 is ascending, in the first regime, high pressure from port 282 of selector valve 275 is applied, via 1st Regime Valve 152, in the extended condition, to the left hand end of Regime Shift Valve 290 and acts on the end face of land 292 to hold spool 291 to the right.

The right hand end of valve 290 is at this time connected to sump via 2nd Regime Valve 153, in the extended condition.

As piston rod 127 ascends, a point is reached at which cam 131 engages 1st Regime Valve 152 and retracts its spool to remove the pressure from the left hand end of Regime Shift Valve 290 and exhaust this space to sump. The spool does not move however because of the detent mechanism 296. Later during the rise of piston rod 129, cam 131 engages the 2nd Regime Valve 153 to retract its spool, whereupon high pressure from port 282 is admitted to the right hand end of Regime Shift Valve 290 and spool 291 now moves to the left to initiate the change into the second regime.

With spool 291 in the position shown in the FIG. 10 high pressure from port 282 of selector valve 275 is applied to the top of Regime Actuator 267 by reason of two ports connected to these two points being between lands 292 and 293.

As already explained, low pressure from port 288 of Selector Valve 275 is connected to cylinder space 244 by reason of ports connected to these points being between lands 293 and 294 of Regime Shift Valve 290. The outlet to space 244 is also permanently connected to the lower end of Regime Actuator 267 which stays in the lower position as shown in the drawing since it has high pressure in its upper end and low pressure in its lower end.

When spool 291 moves, on retraction of valve 153, land 292 uncovers a port connected to sump and puts it into communication with the upper end of Regime Actuator 267. Land 293 passes to the other side of the port admitting high pressure from port 282 of the Selector Valve 275 and puts this port into communication with cylinder space 240 (via cylinder space 244 and passage 257, FIG. 9) to engage clutch 209, and also with the lower end of Regime Actuator 267 to urge pivot 266 to the upper position 269. Land 294 blocks the port connected to the low pressure from port 288 of Selector Valve 275.

Figure 11:
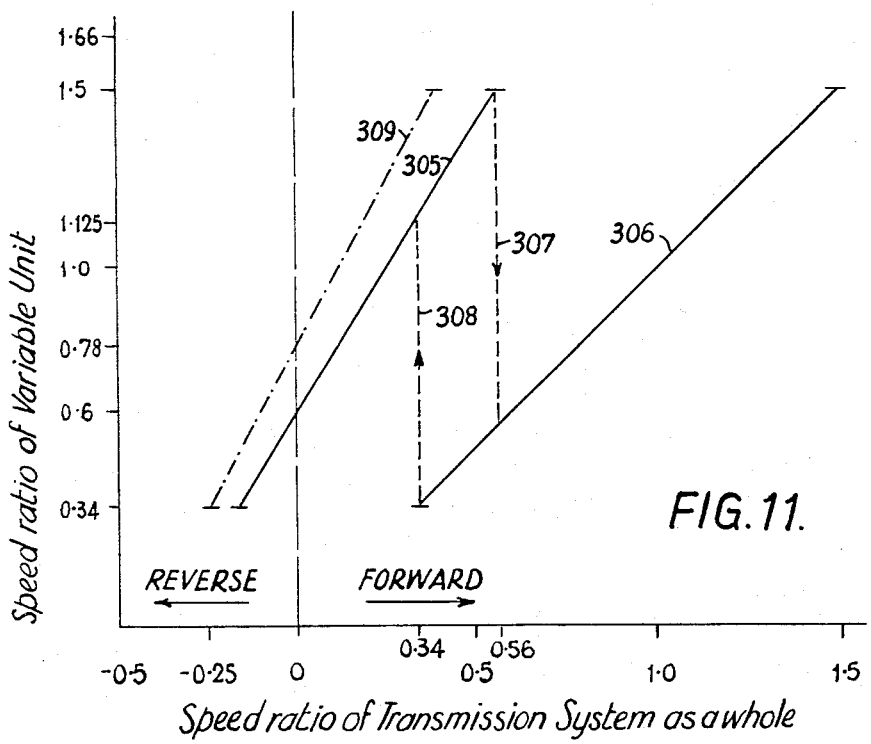

When piston rod 129 descends as the overall ratio is falling, in the second regime, 2nd Regime Valve 153 changes over first to the extended condition and exhausts the right hand end of Regime Shift Valve 290, but spool 291 does not move because of detent device 296. A little later 1st Regime Valve 152 changes over to the extended condition, admitting pressure to the left hand end of Regime Shift Valve 290 whereupon the shift back into the first regime takes place. It will thus be seen that the shift up into the second regime takes place at a higher point in the overall ratio range than the point at which the change down into first regime takes place. This ensures that the system cannot oscillate between the two regimes if the signal from Demand Valve 101 calls for a ratio in the vicinity of a single regime changeover point. The ratio change points in a typical case are shown in FIG. 11.

When pivot 266 is urged upward by the Regime Actuator 267 on the change into the second regime, spool 147 of the Ratio Servo Valve 135 is raised to the upper stop, admitting high pressure to the lower side of piston 137. A lowering of the ratio of the Variable unit is thus initiated but until it is completed, Servo Valve rod 134 cannot rise to the full extent necessitated to enable pivot 266 to rise to point 269. Should the Demand Valve 101 be central at this time, this would put an hydraulic lock on Pilot Actuator 127 and the Regime Actuator piston would rise with the rise of piston 137 of the Ratio Actuator 136. If the Demand Valve is not centralised however, piston rod 129 of Pilot Actuator will be coerced upwards owing to the higher pressure applied to Regime Actuator 267, but would revert to its appropriate position as piston 137 approaches the upper end of its stroke after the appropriate change of ratio of the variable unit had been accomplished.

If conditions are such that a continued rise of overall ratio is called for, piston rod 129 continues to rise and Servo Valve 135 operates to cause piston 137 to retrace its course downwards to raise the ratio of the variable unit from the low ratio synchronous point, (at which the overall ratio in the second regime is equal to the overall ratio obtaining in the first regime immediately prior to the change out of the first regime), until the highest ratio of the variable unit is reached; unless, of course, conditions are such that the rise in the overall ratio is arrested before this point is reached.

If conditions are such that the signal from Demand Valve 101' calls for a continued fall of ratio piston rod 129 will descend until cam 131 falls below 1st Regime Valve 152 so that Regime Shift Valve 290 reverts to the 1st regime state as shown in FIG. 10. Servo Valve 135 is operated downwards to raise the ratio of the variable unit to another synchronous point which is lower than the synchronous point associated with an upwards regime change and is in fact some way short of the upper end of the ratio range of the variable unit.

If the vehicle is brought to a halt after being in the first regime the Demand Valve spool 105' tends to be in its lowest position which tends to call for a rise of ratio. On the other hand, the engine, which is now being turned through the transmission system falls in speed if the ratio is raised and this lowers the body 102' of the Demand Valve tending to lower the ratio.

The engine speed and the ratio thus fall together as the vehicle is slowed down by the wheel brakes and the control system passes through the downwards regime change in the process, finally reaching the geared idling ratio as the vehicle comes to rest.

A "low hold" facility is available by operating lever 271 until the L position of the selector quadrant is reached. The selector valve spool 274 reaches its upper end stops 277 when the D position of the quadrant 116 is reached. Further movement of lever 271 lowers plunger 272 against spring 273 and a tappet 300, in the lower end of plunger 272 is brought to a position in which it prevents the upper end of Pilot Actuator piston rod 129 from reaching the upper end of its stroke. Preferably the quadrant 270 provides a range of L settings to give a range of positions at which the upward movement of piston rod 129 is arrested. When piston rod 129 is arrested in this way the ratio of the variable unit cannot rise further whatever the condition of Demand Valve 101 and the overall ratio is held at this point.

If one of the L positions is selected when the vehicle is moving at great speed, the arresting of piston rod 129 might result in considerable over-speeding of the engine, and for great stresses in the transmission, and/or locking of the road wheels. To obviate this, tappet 300 is urged downwards into its extended position as shown in FIG. 10, by a spring 301.

In the first regime, piston rod 129 cannot rise high enough to reach tappet 300. When D is selected tappet 300 can only be reached by piston rod 129 when it is at the highest position to which it can rise in the second regime.

If the vehicle is halted on a downhill slope and subsequently moves off, the transmission system will be in the first regime and will remain so if the engine is not accelerated. In first regime, rotation of the output shaft does not apply torque to the engine as sprag 212 is wrongly poled for this. Integrity of engine braking is secured however by reason of Output Pump 178 and Pump Shuttle Valve 278.

When a certain vehicle speed is reached the pressure above the spool of valve 278 causes it to descend and disconnect the pump 178 from the lubrication ducts of the transmission system and to connect it instead to torque limiting valve 140 to energise the control system in the manner normally achieved by means of Input Pump 177. The delivery pressure of output pump 178 is therefore able to rise. There are connections from pump 178 to spaces on the inner sides of the 1st Regime Valve and the 2nd Regime Valve the spools of which are biassed inwardly by springs strong enough to resist the pressure delivered by Output Pump 178 when its output is bled by the transmission lubrication ducts but not strong enough to resist that pressure when valve 278 is operated downwardly, so that valves 152 and 153 are retracted and the change into the second regime takes place, clutch 209 being operated in the usual way but by means of a pressure derived from Output Pump 178. It is only necessary for clutch 209 to engage sufficiently to turn the engine because when this happens, input pump 177 delivers at a pressure sufficient to restore Pump Shuttle Valve 278 to the normal condition as shown in FIGURE 10. Under these conditions the engine speed will raise body 102' of Demand Valve 101' and a "raise ratio" signal will be transmitted to ratio actuator 127 which will cause cam 131 to rise into engagement with valves 152 and 153 to hold them in the retracted condition when the pressure from Output Pump 178 ceases to do so. The spring biassing the spool of the Pump Shuttle Valve 278 downwardly, ensures that this valve does not cut off the retracting pressure from valves 152 and 153 before cam 131 can rise to hold them retracted.

When Selector Valve 275 is set to the N position the high pressure is cut off from port 282 and there can be no end load pressure applied to end load cylinder space 233. Sleeve 230 is then free from main shaft 6 and clutch 215' (FIG. 8) is disengaged so that the vehicle can be towed. To start the engine by towing the vehicle D is selected on quadrant 270 and when a sufficient road speed is reached Output Pump 178 operates. (Pump Shuttle Valve 278 being spring-biassed downwards), with the results previously described in relation to resumption of forward motion on a hill after a halt. Clutch 209 is engaged and the system is in the second regime, the engine being turned by the motion of the vehicle. When the engine starts it is advisable to disconnect it from the road wheels by moving the selector valve back to the N condition which cuts off the medium pressure from Pilot Actuator 127 and frees piston 128 from restraint and cuts off the high pressure from clutch 209 and from Ratio Actuator 136, so that there is nothing to stop the variable unit from seeking the geared idling ratio under the influence of any torque reaction it may encounter. Valve 290 may remain in the 2nd regime condition due to there being no high pressure to switch it over to the 1st regime condition. As soon as D is again selected however, the 1st regime will be restored throughout the system.

When R is selected on quadrant 270 the low pressure at port 285 is blocked and port 288 is connected to port 289 and to sump so that the pressure from cylinder spaces 240 and 244 is drained away whereupon dogs 236 and 238 engage to bridge the sprag 212. As piston 128 of the Pilot Actuator now moves only downwards from the position corresponding to the geared idling ratio (in which it is shown in FIG. 10), the second regime cannot be engaged. Initially, in the geared idling position of piston 128, cam 150 holds the Reverse Guard Valve 121 operated so that the lower end of Pilot Actuator cannot be pressurised whatever the signal from Demand Valve 101. This prevents the piston 128 from rising to select a forward ratio when only reverse ratios are required.

FIG. 11 shows a typical arrangement of ratios for the variable unit and the planetary gear train 213. Output/input speed ratios of the variable unit are shown along the vertical axis and overall output/input speed ratios for the transmission system as a whole are shown along the horizontal axis.

The continuous line "curve" 305 shows the ratio obtainable in the first regime and the continuous line curve 306 shows the ratios obtainable in the second regime.

The zero overall ratio or geared idling ratio is obtained with a variable unit ratio of 0.6, the E ratio of planetary gear train 213 being 1.66. The variable unit has a ratio range from 0.34 at the low ratio end, to 1.5 at the high ratio end. The former gives a maximum reverse ratio of —0.16 (about 6.15:1 step-down) and the latter gives a maximum first regime forward ratio of 0.56 (about 1.75 step-down). Before the change up into the second regime takes place the variable unit ratio is taken up to the maximum of 1.5, giving an overall ratio of 0.56. To achieve synchronism in the second regime the variable unit has to be taken down, (as indicated by the dotted line 307), to 0.56, which is substantially above the bottom end of the variable unit ratio range (only a little below the first regime geared idling ratio in fact). In the second regime, the overall ratio can be raised from the change-up synchronous ratio of 0.56 to the highest ratio of the variable unit, namely 1.5.

When the ratio falls, in the second regime, the change does not take place until the lower end of the variable unit ratio range is reached, namely 0.34. This is in the reverse range of the first regime but this does not matter because sprag 212 is disengaged under these conditions. To reach the change-down synchronous ratio, the variable unit ratio has to be raised, (as indicated by the dotted line 308) to 1.125 which is substantially below the higher end of the variable unit ratio range.

The change-up and change-down synchronous ratios could be lowered or raised respectively to reduce the hysteresis, by adjusting the positions of first regime valve 152 and second regime valve 153 in relation to Pilot Actuator 127. This does not increase the overall ratio range of the transmission unit however, though it does reduce the risk of the rollers over-running the edges of the toroidal surfaces of the discs, reducing reliance on end stops to eliminate this risk. It is an advantage to provide a substantial gap between the change-up and the change-down synchronous ratio to avoid hunting between the two regimes.

If this gap is to be reduced so as to improve the overall ratio range of the transmission system for a given ratio range of the variable unit it is necessary to change the E ratio of planetary gear train 213 in a sense such as to move curve 305 to the left, say to the position indicated by the chain dotted line 309, but the advantage is taken in the form of an increased overall ratio range in reverse. There will be occassions when this is called for but if the maximum reverse ratio of —0.1613 adequate, an increase of the overall forward ratio range necessitates a bodily movement of the variable unit ratio range, say from 0.5 at the lower end to 1.66 at the upper end, (that is to say upwards, in FIG. 11).

Whilst the invention has been described in relation to embodiments using a toroidal race rolling friction transmission unit for the variable unit; the invention is nevertheless applicable to arrangements in which the variable unit consists of any other type of transmission unit capable of a continuous and stepless ratio change over a finite range of ratios not including zero.

We claim:

1. A variable speed-ratio transmission system and a control system therefor, comprising the following features in combination:

(a) main input means and main output means for respectively transmitting torque from a motive means to a driven means, (b) a steplessly variable transmission unit (herein called the variable unit), comprising coaxial input and output discs, having facing toroidal surfaces, (c) the variable unit further comprises a plurality of circumferentially-spaced rollers disposed between and in driving engagement with the said toroidal surfaces of the input disc and the output disc respectively, (d) the variable unit further comprises support means for each roller including pivot means for speed-ratio changing pivotal movement of the roller across the said toroidal surfaces, each roller support means including also means providing for movement of its roller in a second mode such that in response to movement in this second mode speed-ratio changing movement of the roller is initiated and such that torque reaction forces arising at the rollers in the course of the transmission of torque through the variable unit tend to move the roller support means in the second mode, (e) speed-ratio control means for the variable unit including means for applying a control force to each of the roller support means to oppose the said torque reaction forces and thereby to control the movements in the second mode on the part of each roller support means, (f) a planetary gear train comprising three concentric gear elements, one of which is a planet carrier carrying planet pinions meshed to provide a geared connection between the other two of the three gear elements, (g) a first mechanical coupling from the main input means to the input disc of the variable unit, a second mechanical coupling from the said input disc to a first one of the said gear elements, a third mechanical coupling from the output disc of the variable unit to a second one of the said gear elements and a fourth mechanical coupling between a third one of the said gear elements and the main output means, whereby the main output means is driven, in a first regime, at an overall speed ratio, as between the main input means and the main output means, which is dependent upon the speed imposed upon the third gear element by the combined rotations of the first gear element and the second gear element and thus dependent upon the speed ratio setting of the variable unit, (h) the ratios of the gears of the planetary gear train are such that in the first regime the range of overall ratios, as between the main input means and the main output means, includes an overall ratio at which the third gear element does not revolve, such ratio being obtained when the ratio of the variable unit is a ratio (herein called the "neutral ratio"), intermediate between the ends of the ratio range of which the variable unit itself is capable, (i) the ratios of the gears of the planetary train are also such that one end of the said range of overall ratios available in the first regime is a ratio which is within and at least close to an end of the range of ratios of which the variable unit itself is capable, (j) means for selectively establishing a driving connection between the output disc of the variable unit and the main output means for selectively disabling at least one of the second, third or fourth mechanical couplings whereby the main output means is driven, in a second regime, by a direct connection from the main input means through the variable unit, at an overall ratio which is not dependent upon the gear ratios of the planetary train, (k) limiting means for the control force application means of the speed ratio control means adapted to limit the force applied to the roller support means to a maximum value which just balances the torque reaction forces applied by the rollers to the roller support means when, in the second regime the lowest overall ratio between the main output means and the main input means obtains and the torque applied to the main input means is at the maximum value for which the variable unit is rated, whereby excessive torques between the input disc, the output disc and the rollers, of the variable unit, are avoided in the first regime in the vicinity of the neutral ratio of the variable unit, (l) servo means for the speed-ratio control means comprising a sensor of the speed of the main input means, a demand member adapted for control by an operator, and a signal generator with inputs from the sensor and the demand member and adapted to generate a signal indicative of a required overall ratio as between the main input member and the main output member, (m) first valve means, operable when the signal from the signal generator reaches a predetermined value, for changing the states of the said selectively establishing and disabling means to change between one and another of the said regimes.

2. A transmission system as claimed in claim 1, with second valve means, operable, when the signal from the signal generator reaches the said predetermined value for momentarily relieving the said control force from the speed ratio control means whereby the rollers of the variable unit are tree to seek a synchronous ratio.

3. A transmission system as claimed in claim 1 in which, the gear ratios of the planetary train, the arrangement of the said mechanical connections and selectively operable establishing and disabling means are such that a change of ratio in a predetermined direction on the part of the variable unit produces a change of overall ratio in a predetermined sense in the first regime and a change of ratio in the opposite direction on the part of the variable unit produces a change of overall ratio in the same predetermined sense in the second regime and so that one ratio at least near to an end of the range of ratios of which the variable unit itself is capable yields the same overall ratio in either of the two regimes.

4. A transmission system as claimed in claim 1 in which the gear ratios of the planetary train and the arrangement of the said mechanical connections is such that in the first regime a change of ratio in one sense as between the input disc and the output disc of the variable unit, produces an overall ratio change in the opposite sense as between the main input means and the main output means.

5. A transmission system as claimed in claim 1 in which the said neutral ratio of the variable unit is so located in the range of ratios of which the variable unit is capable, that changes in one sense of the variable unit ratio, in the first regime, provides a range of overall speed-ratios between zero and a maximum not less than 0.09:1 in a first direction of relative rotation as between the main input means and the main output means and changes of the ratio of the variable unit in the other sense provide a range of overall ratios in the first regime between zero and a maximum of not less than 0.23:1 in a second direction of rotation as between the main input means and the main output means, opposite to the first direction and in which the said selective establishing means and disabling means are so arranged that, in the second regime the main output means rotates in the second direction relative to the main input means.

6. A transmission system as claimed in claim 1 with an output member for the signal generator of the servo means movable over a range of positions under control of signals generated by the signal generator, an input member for the speed ratio control means and coupling means between the output member and the input member, the coupling means comprising a cam which gives one sense of relative motion between the input means and the output means for a first section of the range of motion of the output member, up to and including the position corresponding to the said predetermined value of the signal from the signal generator and gives the opposite sense of relative motion between the output member and the input member on further movement of the output member in the same direction beyond the said position.

7. A transmission system as claimed in claim 6 in which the speed-ratio control means comprises a source of fluid under pressure, an hydraulic actuator having an output member through which the said force is applied to each roller mounting, and an hydraulic valve controlling the application of the said fluid to the actuator, the valve having a movable control element coupled to the said input member.

8. A transmission system as claimed in claim 6 in which the servo means comprises an actuator having an output element which is movable along a first predetermined path and which constitutes the output member of the signal generator, in which the speed-ratio control means comprises a servo valve with an operating element which is movable along a second predetermined path to vary the ratio of the variable unit and which constitutes the input element of the speed-ratio control means the control system further comprising a cam movable with the output element of the said actuator, such cam constituting the said coupling between the output element of the signal generator and the speed-ratio control means and having a profile such that, over one part of the path of the output member of the actuator, the operating element of the servo valve is moved in one direction along its said path and over another part of the path of the output element of the actuator the operating member of the servo valve is moved in the other direction along its said path.

9. A transmission system as claimed in claim 8 with a cam movable with the output element of the said actuator and cam follower means adjustable to encounter the cam at selectable positions in the movement of the said output element along its said path and with means, operable when the said cam follower encounters the said cam to reverse the sense of the said signal of the signal generator, whereby further movement of the output element of the actuator in a predetermined direction is arrested.

10. A transmission system as claimed in claim 1 with an output member for the signal generator of the servo means, an input member for the speed ratio control means and coupling means between the output member and the input member, the coupling means comprising a linkage and means operable when the output member reaches a position corresponding to the said predetermined value of the signal from the signal generator for changing the effective length of the said linkage whereby the input member is moved back from one end to the other of its permissible range of movement and whereby further movement of the output member in the same direction as that in which it approached the said position causes renewed motion of the input member over its permissible range of movement in the same direction as it was previously moved by the output member in so approaching the said position.

11. A transmission system as claimed in claim 10 with an actuator forming part of the signal generator and having an output element which forms the output member of the servo means and which is adapted to move along a first predetermined path, with a servo valve forming part of the speed-ratio control means and having a movable valve element which forms the input member of the speed-ratio control means and which is adapted to move along a second predetermined path, link means coupling together the said output element and the said movable valve element, a fulcrum for the link means, a fulcrum actuator operable to move the fulcrum from one to another of two predetermined positions, trigger means associated with the said output element and operable on that element reaching the said position along the first predetermined path to operate the fulcrum actuator, whereby on movement of the fulcrum, for a given position of one of the said elements along its said path the position of the other of the said elements along its said path is changed and with means operable under control of the trigger means for selectively operating the said connection establishing means and connection disabling means to change the transmission system from one of the said regimes to the other of said regimes.

12. A transmission system as claimed in claim 1 in which the means for selectively establishing a driving connection between the output disc of the variable unit and the main output means is a friction clutch with fluid-operated means for engaging the same and a fluid connection from the first valve means whereby the friction clutch is engaged and disengaged under control of the first valve means.

13. A transmission system as claimed in claim 12 in which the means for disabling at least one of the second, third or fourth mechanical couplings comprises an automatic unidirectional clutch poled to transmit torque only in that direction of torque transmission, through the said one of the said mechanical connections, which obtains when the first regime is in operation.

14. A transmission system as claimed in claim 13, in which automatic unidirectional clutch is interposed between input element of the variable unit and the first gear element of the planetary gear train and oriented to transmit torque from the said first element of the planetary gear train to the input element of the variable unit in a predetermined normal direction of rotation of these elements but not to transmit torque from the input element of the variable unit to the first element of the planetary gear train in the said normal direction of rotation.

15. A transmission system as claimed in claim 14 in which the said friction clutch is connected so as to couple together the second and third members of the planetary gear train to establish the second driving connection, whereby to engage the second regime.

16. A transmission system as claimed in claim 14 and with further clutch means operable to connect or disconnect the input element of the variable unit to or from the said unidirectional clutch, operating means for the further clutch means adapted to engage the clutch means when the rotational speed of the input element of the prime mover attains a predetermined speed.

17. A transmission system as claimed in claim 1 in which the said driving connection establishing means comprises direction-reversing gears interposed between the output disc of the variable unit and the main output means which gears have a speed ratio of approximately 1:1.

18. A transmission system as claimed in claim 17 in which the direction-reversing gears consist of a planetary gear train having two coaxial sun wheels each engaged by one of a pair of interconnected planet wheels mounted on a planet carrier fast with the output disc of the variable unit in which one of the sun wheels is fast with the main output means and in which the driving connection establishing means comprises means for selectively arresting rotation of the other sun wheel to engage the second regime or permitting it to rotate freely to disengage the second regime.

19. A transmission system as claimed in claim 1 in which, the said driving connection establishing means comprise direction-reversing gears interposed between the output disc of the variable unit and the main output means which gears have a step-down ratio, that is to say the main output means rotates more slowly than the output disc so that the maximum overall ratio available in the first regime is brought within the range of overall ratios available in the second regime, by the said gears.

20. A transmission system as claimed in claim 19 in which, in the first regime, the third element of the planetary gear train is coupled to the main output means through gears which have a step-down ratio so that the main output means rotates more slowly than, but in the same direction as, the said third element of the planetary gear train whereby the highest overall ratio in the first regime becomes approximately equal to the lowest ratio of the variable unit as modified by the said step-down direction-reversing gears.

21. A transmission system as claimed in claim 1 in which the planetary gear train comprises two coaxial sun wheels each engaging one of a pair of planet wheels coupled together and mounted on a planet carrier fast with the output disc of the variable unit, one of the sun wheels being fast with the input disc of the variable unit and in which the said means for selectively disabling one of the said mechanical couplings comprises means for uncoupling the other sun wheel from the main output means to disengage the first regime or alternatively coupling them together to re-engage the first regime.

22. A transmission system as claimed in claim 1 in which the ratio of the first gear element of the planetary gear train (which is coupled by the second mechanical coupling to the input disc of the variable unit) to the second gear element of the gear train (which is coupled by the third mechanical coupling to the output element of the variable unit) is a ratio within the ratio range of which the variable unit is capable and is between the middle and the lower end of that range but is nevertheless a substantial degree above the lower end, whereby when the variable unit ratio is changed from said ratio of the said elements of the planetary gear train towards the lower end of the ratio range of the variable unit, the output element of the transmission system rotates in the opposite direction from that obtaining in the second regime.

23. A variable speed ratio transmission system and a control system therefor, comprising the following features in combination:
(a) main input means and main output means for transmitting torque from a motive means to a driven means respectively,
(b) a steplessly variable transmission unit (hereinafter called the "variable unit"), having an input disc and an output disc mounted for rotation about a common main axis and having facing toroidal surfaces, rollers engaging the toroidal surfaces of the discs and providing a driving connection between them, support means for each roller defining a rolling axis for the roller and a swing axis about which it may rotate to change the ratio as between the input disc and the output disc, the support means further providing freedom of motion in a mode producing relative motion between the rolling axis of the roller and the main axis whereby the roller may be caused to steer itself along helical paths on the toroidal surfaces of the discs so that the roller rotates about the swing axis to change the ratio, the said mode of motion having a component of motion tangential to the torus centre circle around which notionally rotates the centre of a circle which is the generator of the toroidal surfaces of the discs whereby torque reaction forces arising from the driving action of the roller tend to initiate a change of ratio, (c) speed-ratio control means for the variable unit comprising means for applying to each roller support means a force opposing the said torque reaction forces, (d) a planetary set comprising three concentric elements one of which is a planet carrier providing rotational supports for planetary means each in driving engagement with the other two concentric elements, (e) a first mechanical connection between the main input means and the input disc of the variable unit, (f) a second mechanical connection between the input disc and a first one of the three concentric elements of the planetary set, (g) a third mechanical connection between the output disc and a second one of the three concentric elements of the planetary set, (h) a fourth mechanical connection between a third one of the three concentric elements of the planetary set and the main output means, (i) the speed ratio between the concentric element connected by the second mechanical connection and the concentric element connected by the third mechanical connection is a ratio which is within the range of ratios of which the variable unit itself is capable and is between the middle and the lower end of such range such ratio being called the neutral ratio of the variable unit, (j) the 2nd, 3rd and 4th of the said mechanical connections being such as to provide a recirculating power system wherein the main output means is driven in a first regime, at a speed dependent upon the speed imposed on the third concentric element by the rotations of the 1st and 2nd concentric elements and so dependent on the ratio of the variable unit, the power transmitted through the variable unit exceeding the power transmitted between the main input means and the main output means and the main output means having no rotation imposed upon it over the fourth mechanical connection when the variable unit is adjusted to the neutral ratio and rotating in a first direction when the ratio of the variable unit is raised from the neutral ratio and in a second direction when the ratio of the variable unit is lowered from the neutral ratio, the highest overall ratio as between the main input means and the main output means attainable in the first regime by raising the ratio of the variable unit being a ratio adjacent to the lower end of the ratio range of which the variable unit itself is capable, (k) selectively engageable means for establishing a driving connection between the output disc of the variable unit and the main output means whereby the main output means is driven from the main input means through the variable unit in a second regime without power recirculation through the planetary set, (l) a unidirectional clutch interposed in at least one of them, the second, third or fourth mechanical connections, poled to transmit torque in the direction of torque flow obtaining the first regime whereby on engagement of the selectively engageable means the mechanical connection in which the unidirectional clutch is interposed, is disabled and whereby rotation of the concentric element to which the said mechanical connection leads is free all of restraint except that imposed on it by the other two concentric elements.

24. A transmission system as claimed in claim 23 with servo means for the speed-ratio control means which servo means comprises a demand member adapted for positioning by an operator, a speed-sensing means for sensing the speed of the main input means, combining means with inputs from the demand member and the sensing means and an output means and adapted to move an output member in accordance with the inputs from the demand member and the speed sensing means to any one of a number of positions each indicating an overall ratio for the transmission system characteristic of such inputs as combined by the combining means, means operable on the output member reaching a first predetermined position, in the course of movement in the direction indicative of a rise of overall ratio, for engaging the said clutch means, means operable when the output member, in the course of movement in the direction indicative of a fall of overall ratio, after passing the first predetermined position reaches an adjacent second predetermined position, for disengaging the said clutch means, and a mechanical coupling between the output means and the speed-ratio control means.

25. A transmission system as claimed in claim 24 in which the mechanical coupling comprises a lever with means for shifting its fulcrum, operable on the output member reaching the first predetermined position after passing the second predetermined position, to shift the said fulcrum in one direction which controls the speed ratio control means to lower the ratio of the variable unit and operable on the output member reaching the second predetermined position after passing the first predetermined position for shifting the fulcrum in another direction which controls the speed ratio-control means to raise the ratio of the variable unit.

26. A transmission system as claimed in claim 23 with limiting means for the speed-ratio control means adapted to limit the force from the force applying means so that it cannot whilst the first regime is in operation, exceed that required just to balance the torque reaction forces applied by the rollers to the roller supports when the said driving connection is established between the output disc of the variable unit and the main output means, that is to say when the second regime is in operation, and when the torque applied to the input disc is the maximum for which the variable unit is rated.

References Cited

UNITED STATES PATENTS

| | | | |
|---|---|---|---|
| 1,817,159 | 8/1931 | Morison | 74—691 |
| 2,123,006 | 7/1938 | Hayes | 74—472 X |
| 2,283,759 | 5/1942 | Pollard | 74—688 |
| 2,285,431 | 6/1942 | Grossenbacher | 74—687 |
| 2,833,160 | 5/1958 | Morgan | 74—687 X |
| 3,006,206 | 10/1961 | Kelley et al. | 74—472.1 |
| 3,122,025 | 2/1964 | Mark et al. | 74—687 X |
| 3,184,990 | 5/1965 | Perry | 74—472.1 |
| 3,202,012 | 8/1965 | Jania | 74—472.1 |
| 3,203,276 | 8/1965 | Bullard | 74—687 |
| 3,204,486 | 9/1965 | De Lalio | 74—687 |
| 3,212,358 | 10/1965 | De Lalio | 74—687 |
| 3,238,816 | 3/1966 | Schottler | 74—690 |
| 3,244,025 | 4/1966 | Francisco | 74—690 |
| 3,292,449 | 12/1966 | Lewis et al. | 74—472.1 |
| 3,302,487 | 2/1967 | Kempson | 74—687 |
| 3,306,129 | 2/1967 | De Lalio | 74—687 |

FRED C. MATTERN, JR., *Primary Examiner.*

THOMAS C. PERRY, *Assistant Examiner.*